United States Patent [19]
Fukuoka

[11] Patent Number: 6,023,234
[45] Date of Patent: Feb. 8, 2000

[54] EFM ENCODER AND DSV CALCULATOR

[75] Inventor: Toshihiko Fukuoka, Osaka, Japan

[73] Assignee: Matsushita Electric Industrial Co., Ltd., Osaka, Japan

[21] Appl. No.: 08/603,918

[22] Filed: Feb. 22, 1996

[30] Foreign Application Priority Data

Feb. 23, 1995 [JP] Japan .................................. 7-035141
Oct. 5, 1995 [JP] Japan .................................. 7-258541

[51] Int. Cl.$^7$ .............................. G06F 5/00; G11B 7/00
[52] U.S. Cl. .............................................. 341/58; 341/59
[58] Field of Search ................................ 341/58, 59, 50

[56] References Cited

U.S. PATENT DOCUMENTS

| | | | |
|---|---|---|---|
| 5,077,721 | 12/1991 | Sako et al. ................................. | 369/59 |
| 5,349,349 | 9/1994 | Shimizume ............................... | 341/58 |
| 5,375,249 | 12/1994 | Cho ......................................... | 395/800 |
| 5,438,621 | 8/1995 | Hornak et al. ............................ | 380/43 |

*Primary Examiner*—Jeffrey A. Gaffin
*Assistant Examiner*—Peguy JeanPierre
*Attorney, Agent, or Firm*—McDermott, Will & Emery

[57] ABSTRACT

There is provided an EFM encoder comprising a DSV calculator which is smaller in circuit scale than a conventional DSV calculator. The above DSV calculator has a merging-bit DSV calculator, a frame-signal DSV/polarity evaluator, adding means, and an overflow/underflow processor. The merging-bit DSV calculator calculates merging-bit DSV data based on merging bits and on a cumulative polarity signal. The frame-signal DSV/polarity evaluator outputs frame-signal DSV data in consideration of the polarity in the final bit of the merging bits. The adding means adds up the cumulative DSV data, the merging-bit DSV data, and the frame-signal DSV data so as to calculate DSV. The overflow/underflow processor performs, when overflow or underflow has occurred in the result of calculation from the adding means, exception handling with respect to the calculation result and outputs the calculation result that has undergone the exception handling as new cumulative DSV data. Even when overflow or underflow has occurred in the obtained cumulative DSV data, the accuracy of DSV calculation performed by the DSV calculator is not reduced.

13 Claims, 14 Drawing Sheets

FIRST BIT CONVERTER 16a

SECOND BIT CONVERTER 16b

EFM ENCODER AND DSV CALCULATOR

BACKGROUND OF THE INVENTION

The present invention relates to EFM (Eight to Fourteen Modulation) encoders for use in a minidisc system and the like and, more particularly, to an EFM encoder with the function of calculating DSV (Digital Sum Variation) as an index for selecting merging bits which connect individual frame signals to each other. The present invention also relates to DSV calculators for calculating, in EFM, DSV as an index for selecting merging bits which connect individual frame signals to each other and, more particularly, to a DSV calculator capable of calculating DSV with a higher accuracy than was previously possible.

EFM is a modulation method used in the recording of audio data on an optical disc in a minidisc system or the like.

FIG. 13(a) shows a part of a translation table used in EFM and a signal waveform presented by EFM-modulated data. As shown in the drawing, EFM is for converting digital data originally composed of 8 bits to a pattern of 14 bits. The bit pattern of the original 8-bit data has 256 ($=2^8$) variations to be compatible with individual data.

In the EFM-modulated data, the symbol "0" represents retention of polarity ("H" or "L") in the immediately preceding data, not the low level, while the symbol "1" represents inversion of porality, not the high level. Therefore, as shown in FIG. 13(a), the signal waveform presented by the EFM-modulated data makes a transition depending on whether the porality in the final bit of the immediately preceding data is "H" or "L".

EFM is required in the recording of audio data on an optical disc since the frequency band in the pick-up mechanism of the optical disc is limited. Accordingly, if the length of a pit indented in the optical disc is extremely short, it becomes difficult to read the audio data therefrom. To prevent the difficulty, original audio data is converted to data in which two or more "0s" are interposed between every two adjacent "1s". Since the 14-bit pattern has 16384 ($=2^{14}$) variations, 256 variations compliant with the rule of two or more "0s" between every two adjacent "1s" are selected therefrom, which constitute the translation table for EFM.

In an actual EFM encoder, inputted serial data is divided into 8-bit sets, each of which is converted to 14-bit frame data in accordance with the translation table for EFM, while a 24-bit frame synchronize signal is placed after every specified number of sets of frame data. Between the two adjacent sets of frame data or between the frame data and the frame synchronize signal is interposed merging bits.

A description will be given below to the merging bits.

Even when the original audio data is converted to the data in which two or more "0s" are interposed between every two adjacent "1s", there may be cases where the rule of two or more "0s" between every two adjacent "1s" is not satisfied in a connection between different sets of data.

For example, if the final bit of a certain set of data is "1" and the leading bit of the following set of data is "1", two consecutive "1s" are observed when the two sets of data are connected to each other, which does not satisfy the rule of two or more "0s" between every two adjacent "1s". To avoid this, EFM has used data composed of 3 bits in order to connect two sets of data to each other. The connecting 3 bits are termed merging bits.

Since the merging-bit data is composed of 3 bits, 8 ($=2^3$) bit patterns exist. Of the 8 bit patterns, only four patterns of "000", "100", "010", and "001" are suitable for actual use, since the other four patterns of "111", "110", "101", and "011" are incompatible with the rule of two or more "0s" between every two adjacent "1s" for EFM. From the four available patterns, the optimum one is selected as the merging bits for each connection.

The selection of the merging bits is performed as follows. First, the patterns of the merging bits which are compliant with the rule of two or more "0s" between every two adjacent "1s" are selected based on the final bit pattern of the preceding set of data and on the leading bit pattern of the following set of data.

In the case where the latter three bits of the preceding set of data are "011" and the former three bits of the following set of data are "100", for example, only "000" can be used as the merging bits. In the case where the latter three bits of the preceding set of data is "100" and the former three bits of the following set of data is "001", each of the four patterns of "000", "100", "010", and "001" can be used as the merging bits.

If a plurality of patterns can be used as the merging bits, the optimum one is selected therefrom based on the value of DSV.

Here, a description will be given to DSV (Digital Sum Variation).

DSV represents an unbalance in a direct-current component of the modulated data, which can be calculated considerably easily in practice. To provide DSV, it is sufficient to substitute +1 for each segment of the signal waveform of the EFM-modulated data that remains in the high level for a unit period of time, substitute −1 for each segment thereof that remains in the low level for the unit period of time, and calculate the sum of these values.

FIG. 13(b) is a view illustrating a method of selecting the merging bits based on the value of DSV. In the drawing, since the final bit pattern of the preceding set of data is "010" and the leading bit pattern of the following set of data is "001", the three patterns of "000", "010", and "001" can be used as the merging bits. Hence, the value of DSV has been calculated in each of the cases where "000" is selected, where "010" is selected, and where "001" is selected. Here, it is assumed that DSV in the final bit of the immediately preceding set of data (hereinafter referred to as cumulative DSV) is −3. It is also assumed that the porality in the final bit of the immediately preceding set of data (hereinafter referred to as a cumulative polarity) is "H".

In the case where "000" is selected, DSV of the merging bits is 3, while the polarity in the final bit of the merging bits is "H". Accordingly, DSV of the following set of data becomes +2, while DSV in the final bit of the following set of data (hereinafter referred to as new cumulative DSV) becomes +2. In the case where "010" is selected, DSV of the merging bits is −1, while the polarity in the final bit of the merging bits is "L". Accordingly, DSV of the following set of data becomes −2, while new cumulative DSV becomes −6. In the case where "001" is selected, DSV of the merging bits is +1, while the polarity in the final bit of the merging bits is "L". Accordingly, DSV of the following set of data becomes −2, while new cumulative DSV becomes −4.

In terms of tone quality and like factor, it is preferable that the value of DSV is maximumly approximated to 0. Consequently, "000" is selected here as the merging bits so that new DSV becomes closest to 0.

However, the conventional EFM encoder presents the following problem.

Since the EFM encoder is generally used in digital audio processing, it is not required to calculate DSV at a remarkably high speed. It is sufficient to perform the process of calculating DSV in accordance with the flow of audio data, so that a reduction in circuit scale of the DSV calculator becomes the top priority issue.

The calculation of DSV is performed by either a serial method or a parallel method. In the serial method, DSV is sequentially calculated for individual bits of EFM-modulated data from the leading one first. In the parallel method, on the other hand, DSV is calculated by preliminarily calculating DSV for each of the frame synchronize signal, frame data, and merging-bit data and adding each value of DSV to the value of cumulative DSV.

In the case of using the serial method, the algorithm of DSV calculation itself is comparatively simple. However, since DSV is an index for selecting merging bits, the DSV calculator is also required to perform the function of distinguishing among the frame synchronize signal, the frame data, and the merging-bit data in the EFM-modulated data, i.e., the function of indicating the beginning and ending positions of each data, in addition to the function of calculating DSV. Consequently, the DSV calculator is disadvantageously increased in circuit scale, though the algorithm of DSV calculation itself is comparatively simple.

In the case of using the parallel method, on the other hand, it becomes necessary to perform the function of selecting correct DSV in consideration of the polarity of the immediately preceding data. Consequently, the DSV calculator is also increased in circuit scale unless the circuit design is adequately designed, similarly to the serial method.

There are also other problems as described below.

The maximum and minimum values of cumulative DSV data are determined by the number of bits representing the cumulative-DSV data. For example, if cumulative DSV is represented by 8 bits, it follows that only the decimal numbers of "–128" to "127" can be represented thereby. In practice, however, there may be cases where the cumulative DSV data is over the maximum value and where the cumulative DSV data is under the minimum value, resulting in so-called overflow and underflow.

If the maximum value of cumulative DSV data is outputted as new cumulative DSV data when overflow has occurred in the cumulative DSV data or if the minimum data of cumulative DSV data is outputted as new cumulative DSV data when underflow has occurred in the cumulative DSV data, there may be an error between correct cumulative DSV data and the new cumulative DSV data, and that it will never be corrected.

FIG. 14 are graphs each showing a variation in cumulative-DSV data, of which FIG. 14(a) shows the case where overflow has not occurred and FIG. 14(b) shows the case where overflow has occurred. The symbol ○ represents cumulative DSV data obtained from a DSV calculator and the symbol □ represents corrected cumulative DSV data after overflow has occurred. Since it has been assumed here that the cumulative DSV data is represented by 8 bits, the maximum value thereof becomes "127", so that overflow occurs when the cumulative DSV data exceeds "127".

As shown in FIG. 14(a), when overflow has not occurred, there is no error between cumulative DSV data actually obtained and correct cumulative DSV data. However, when overflow has occurred as shown in FIG. 14(b), the cumulative DSV data is corrected to the maximum value of "127", so that an error may occur thereafter between the cumulative DSV data actually obtained and the correct cumulative DSV data and will never be corrected. On the contrary, it will become larger every time overflow occurs.

SUMMARY OF THE INVENTION

It is therefore an object of the present invention to provide an EFM encoder comprising a DSV calculator which practically presents no problem associated with processing speed and which is smaller in circuit scale than a conventional DSV calculator.

To attain the above object, an EFM (Eight to Fourteen Modulation) encoder comprises: a merging-bit selector for selecting merging-bit data which connects to each other any adjacent two of a plurality of frame signals sequentially inputted, the above merging-bit selector having a DSV calculator for calculating DSV (Digital Sum Variation) as an index for selecting the optimum merging-bit data for each frame signal and for each merging-bit data.

The structure enables the DSV calculator to calculate DSV as an index in the selection of the optimum merging-bit data by the merging-bit selector for each frame signal and for each merging-bit data, so that there can be implemented an EFM encoder comprising a DSV calculator which is smaller in scale than the conventional one.

The above merging-bit selector further comprises a merging-bit generator for generating, for each of the inputted frame signals, the merging-bit data which connects the above frame signal as a first frame signal to a second signal immediately preceding the first frame signal and the above DSV calculator preferably has a function of receiving frame-signal DSV data representing a value of DSV of the above first frame signal, a frame-signal polarity signal indicating whether or not polarity inversion has occurred in a leading bit or final bit of the above first frame signal, cumulative DSV data representing a value of DSV up to the second frame signal, and a cumulative polarity signal indicating a polarity in a final bit of the second frame signal, calculating DSV based on the above frame-signal DSV data, on the above frame-signal polarity signal, on the above cumulative DSV data, on the above cumulative polarity signal, and on the merging-bit data generated by the above merging-bit generator, generating new cumulative DSV data representing a value of DSV up to the first frame signal and a new cumulative polarity signal indicating a polarity in the final bit of the first frame signal, and outputting them.

The structure enables the DSV calculator to calculate new-cumulative DSV data based on the cumulative DSV data, on the frame-signal DSV data, and on the merging-bit data, so that the DSV calculator can perform its intrinsic function more easily than the conventional DSV calculator, resulting in a reduction in circuit scale.

The above DSV calculator preferably has: a merging-bit DSV calculator which receives the above merging-bit data and the above cumulative polarity signal and outputs merging-bit DSV data representing a value of DSV of the above merging-bit data and a provisional cumulative polarity signal indicating a polarity in a final bit of the above merging-bit data when the above merging-bit data is connected to the second frame signal; a frame-signal DSV/ porality evaluator which receives the above frame-signal DSV data, the above frame-signal polarity signal, and the above provisional cumulative polarity signal outputted from the above merging-bit DSV calculator, substitutes frame-signal DSV data after polarity evaluation for the above frame-signal DSV data in consideration of a polarity of the above provisional cumulative polarity signal, and outputs the frame-signal DSV data after evaluation, while outputting, as the above new cumulative polarity signal, a signal indicating a polarity in the final bit of the first frame signal when the first frame signal is connected to the second frame signal via the above merging-bit data; adding means for adding up the above cumulative DSV data, the above merging-bit DSV data outputted from the above merging-bit DSV calculator, and the above frame-signal DSV data after polarity evaluation outputted from the above frame-signal DSV/polarity evaluator so as to output a result of addition as the above new cumulative DSV data; and an overflow/underflow processor which judges whether or not overflow or underflow has occurred in the new cumulative DSV data outputted from the above adding means and performs exception handling with respect to the above new cumulative DSV data when overflow or underflow has occurred therein.

The structure enables the function of calculating DSV to be performed more easily than has previously been performed, so that the circuit scale of the DSV calculator can be reduced considerably. Moreover, since the exception handling is performed with respect to DSV data when necessary, the reliability of the data can also be improved.

Another object of the present invention is to provide a DSV calculator which does not present reduced accuracy even when overflow or underflow has occurred in cumulative DSV data.

To attain the above object, the DSV calculator of the present invention comprises an overflow/underflow processor having the function of holding, when overflow or underflow has occurred in the process of calculating cumulative DSV data, differential data on a difference between the result of calculation and the maximum or minimum value of the cumulative-DSV data and adding the differential data to the cumulative DSV data afterwards.

Specifically, the present invention has aimed at a DSV calculator for calculating, upon receiving each frame signal, DSV as an index for selecting merging-bit data which connects modulated frame signals to each other. The above DSV calculator comprises: adding means for adding up cumulative DSV data representing a value of DSV up to the frame signal immediately preceding the above frame signal, frame-signal DSV data representing a value of DSV of the above frame signal, and merging-bit DSV data representing a value of DSV of the merging-bit data which connects the above frame signal to the immediately preceding frame signal so as to output a result of addition; and an overflow/underflow processor for judging whether or not overflow or underflow has occurred in the addition result outputted from the above adding means, performing exception handling with respect to the above addition result when overflow or underflow has occurred therein, and outputting the above addition result that has undergone the exception handling as new cumulative DSV data, wherein the above overflow/underflow processor has a function of holding, when overflow has occurred in the addition result outputted from the above adding means, a difference between the above addition result and a maximum value of the above cumulative DSV data and adding, when overflow has not occurred in the above addition result outputted from the above adding means, the held difference to the above addition result, while holding, when underflow has occurred in the addition result outputted from the above adding means, a difference between the above addition result and a minimum value of the above cumulative DSV data and adding, when underflow has not occurred in the addition result outputted from the above adding means, the held difference to the above addition result.

With the structure, even when overflow or underflow has occurred in the calculated cumulative DSV data, an error between the calculated cumulative DSV data and correct cumulative DSV data is corrected afterwards, resulting in improved accuracy of the cumulative DSV data.

DETAILED DESCRIPTION OF THE INVENTION (First Embodiment)

Figure 1:
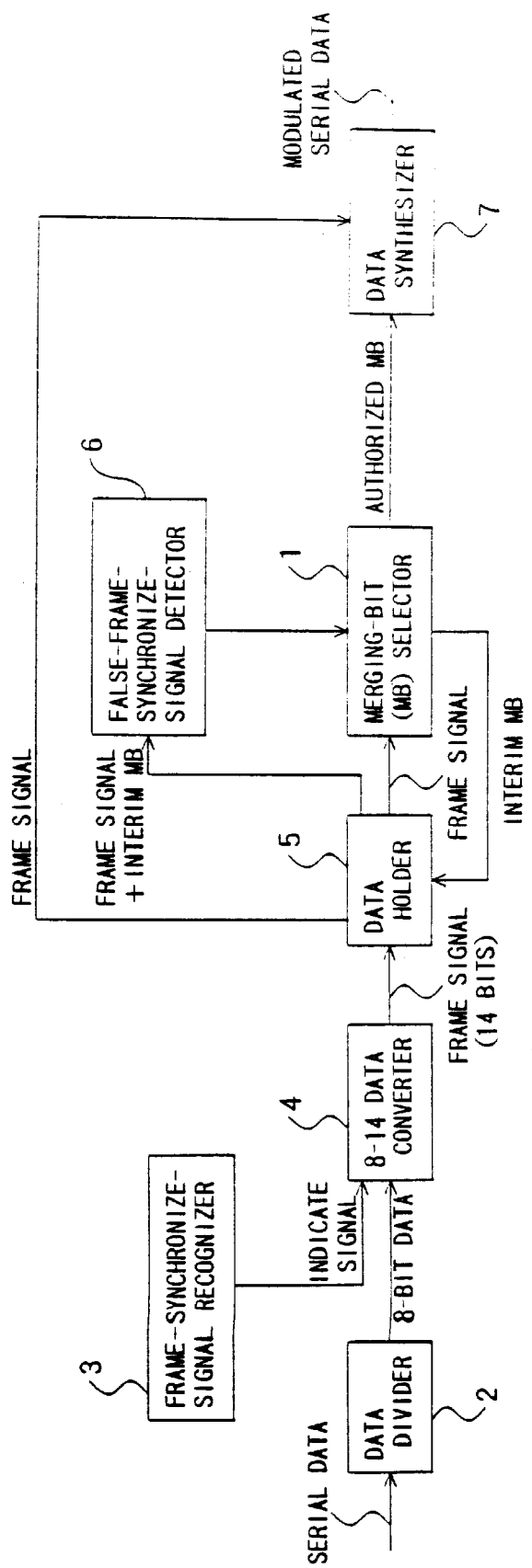
FIG. 1 is a schematic view showing the structure of an EFM encoder according to each of the embodiments of the present invention.

FIG. 1 is a schematic view showing the structure of an EFM encoder according to each of the embodiments of the present invention. A description will be given below to the operation of the EFM encoder shown in FIG. 1.

First, inputted serial data is divided into 8-bit sets of parallel data by a data divider 2.

Next, each of the 8-bit sets of parallel data is converted by an 8-14 data converter 4 to a frame data signal having a 14-bit pattern in accordance with a translation table for EFM. When an indicate signal is received from a frame-synchronize-signal recognizer 3, a frame synchronize signal is interposed between the frame data signals. Although the frame synchronize signal in EFM is composed of 24 bits, a 14-bit provisional frame synchronize signal is inserted in the 8-14 data converter 4. The frame data signal in conjunction with the 14-bit provisional frame synchronize signal will be hereinafter termed a frame signal.

The frame signal outputted from the 8-14 data converter 4 is temporarily held in a data holder 5 and, after merging bits used to connect the frame signal to the immediately preceding frame signal are selected by a merging-bit selector 1, outputted to a data synthesizer 7.

Merging bits are selected in the following manner.

First, the merging-bit selector 1 selects merging bits based on the calculated DSV and outputs the selected ones as provisional merging bits to the data holder 5. The data holder 5 outputs the inputted provisional merging bits in conjunction with the immediately preceding and subsequent frame signals to a false-frame-synchronize-signal detector 6. The false-frame-synchronize-signal detector 6 judges whether or not the inputted signal includes the same bit pattern as the frame synchronize signal and outputs the result of judgment to the merging-bit selector 1. When the inputted signal does not include the same bit pattern as the frame synchronize signal, the merging-bit selector 1 outputs interim merging bits as authorized merging bits to the data synthesizer 7. When the inputted signal includes the same bit pattern as the frame synchronize signal, the merging-bit selector 1 newly selects other merging bits and outputs them as the interim merging bits to the data holder 7.

Finally, in the data synthesizer 7, the frame signal is combined with the authorized merging bits and the 14-bit provisional frame synchronize signal is replaced by a 24-bit frame synchronize signal, which is outputted as serial data after EFM.

Figure 2:
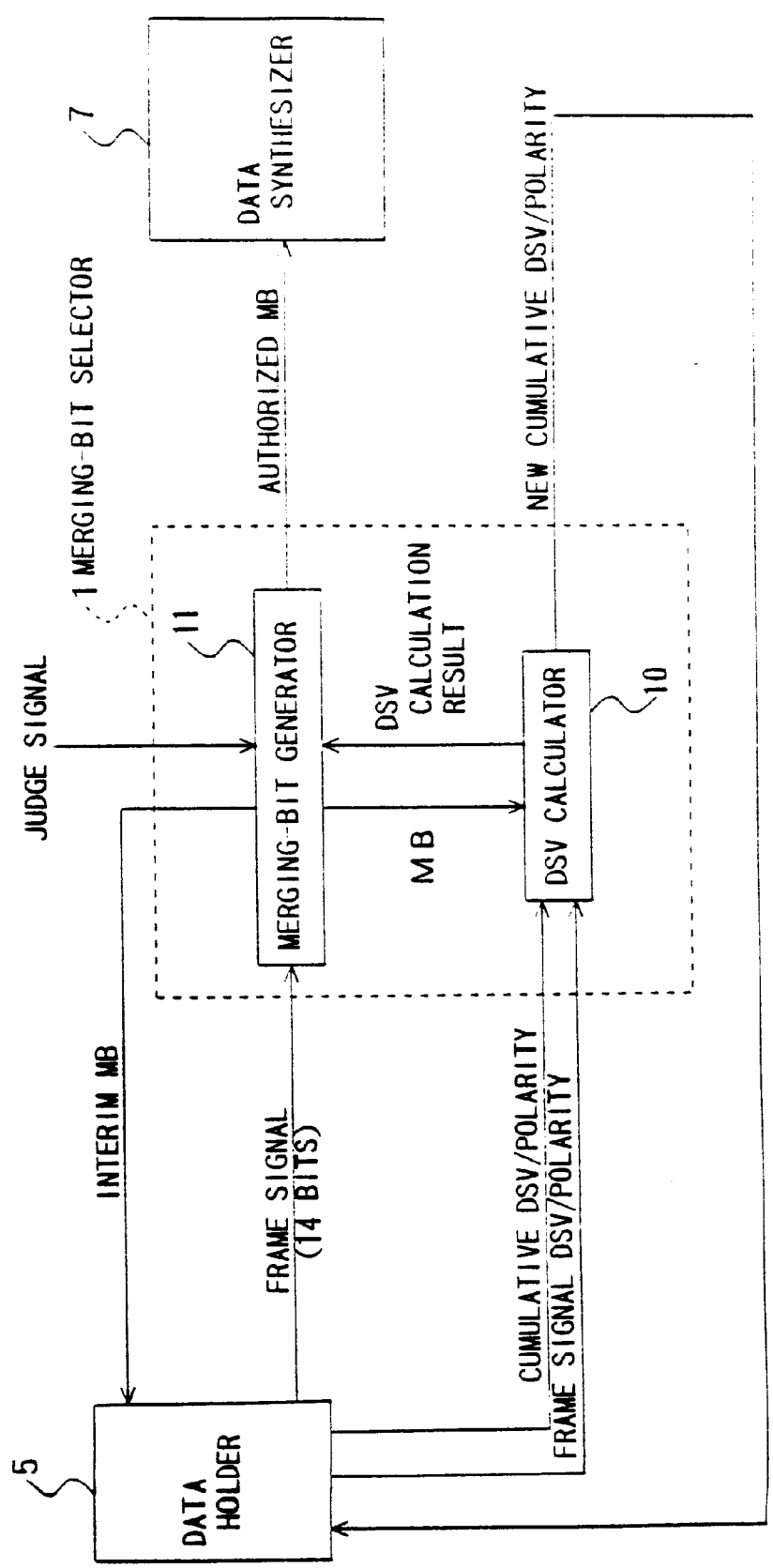
FIG. 2 is a schematic view showing the structure of a merging-bit selector in the EFM encoder according to each of the embodiments of the present invention.

FIG. 2 is a schematic view showing the structure of the merging-bit selector 1. In the drawing, the merging-bit selector 1 consists of a DSV calculator 10 and a merging-bit generator 11.

The merging-bit generator 11 selects usable merging bits based on the leading bit pattern of the inputted frame signal and on the final bit pattern of the immediately preceding frame signal and sequentially outputs them to the DSV calculator 10.

The DSV calculator 10 receives cumulative DSV data and a cumulative polarity signal up to the immediately preceding frame signal as well as the frame-signal DSV data and frame-signal polarity signal of the inputted frame signal so as to calculate DSV in the case of using the merging bits received from the merging-bit generator 11.

The merging-bit generator 11 determines the interim merging bits based on DSV calculated by the DSV calculator 10 and outputs them to the data holder 5. If a judge signal indicates that the inputted signal does not include the same bit pattern as the frame synchronize signal, the interim merging bits are outputted as the authorized merging bits to the data synthesizer 7. On the other hand, the DSV calculator 10 outputs, as new cumulative DSV data and a new cumulative polarity signal, the cumulative DSV data and cumulative polarity signal up to the inputted frame signal to the data holder 5.

The DSV calculator 10 will be described below in greater detail.

Figure 3:
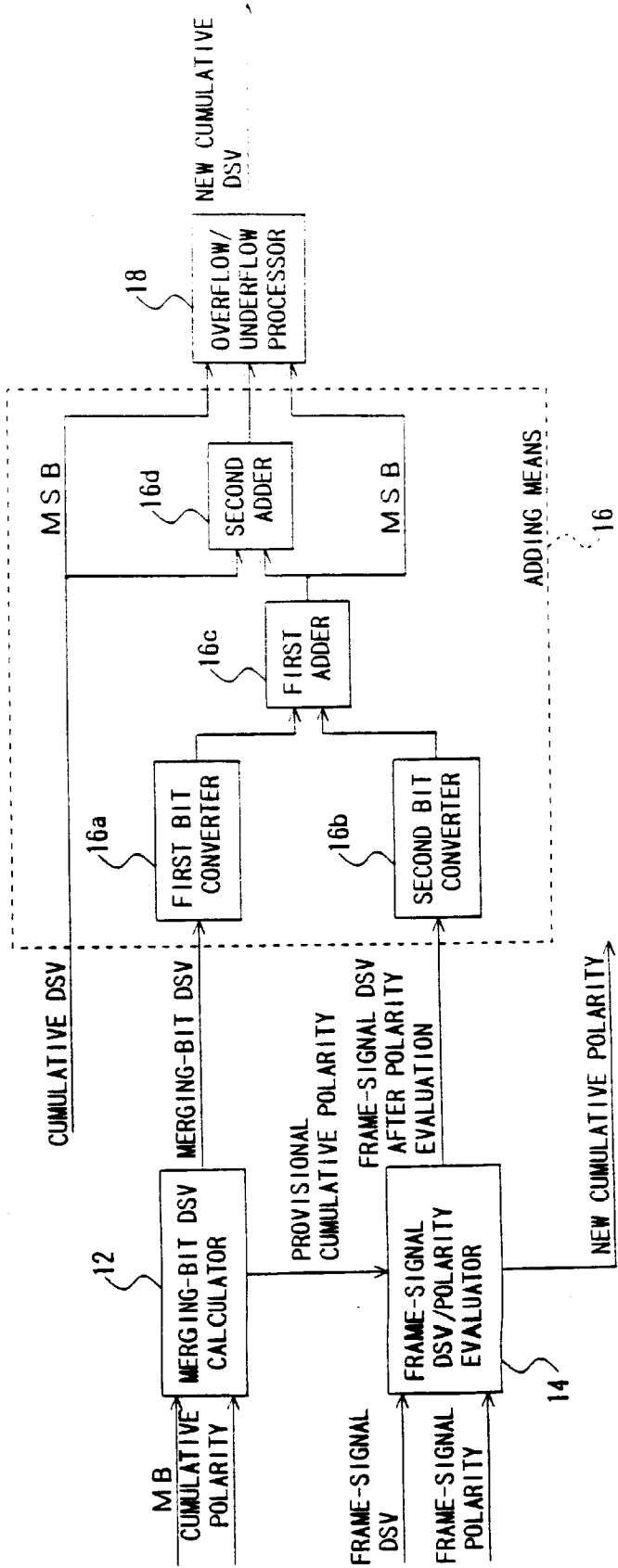
FIG. 3 is a block diagram showing the structure of a DSV calculator according to the first embodiment of the present invention.

FIG. 3 is a block diagram showing the internal structure of the DSV calculator 10. In the drawing are shown: a merging-bit DSV calculator 12; a frame-signal DSV/polarity evaluator 14; adding means 16; a first bit converter 16a; a second bit converter 16b; a first adder 16c; a second adder 16d; and an overflow/underflow processor 18.

The merging-bit DSV calculator 12, upon receiving the merging bits outputted from the merging-bit generator 11, calculates the value of DSV of the above merging bits in consideration of the polarity of the cumulative polarity signal up to the immediately preceding frame signal and outputs the result of calculation as merging-bit DSV data. The merging-bit DSV calculator 12 also outputs the cumulative polarity signal obtained when the above merging bits are connected to the immediately preceding frame signal as the provisional cumulative polarity signal.

The frame-signal DSV/polarity evaluator 14 receives, upon receiving the above provisional cumulative polarity signal, the frame-signal DSV data and frame-signal polarity signal for the frame signal inputted to the merging-bit generator 11 and outputs frame-signal DSV data after polarity evaluation in consideration of the polarity of the above provisional cumulative polarity signal. The frame-signal DSV/polarity evaluator 14 also outputs the cumulative polarity signal up to the inputted frame signal as a new cumulative polarity signal.

The adding means 16 adds up the cumulative DSV data up to the immediately preceding frame signal, the merging-bit DSV data, and the frame-signal DSV data after polarity evaluation and outputs the result of addition.

In the adding means 16, the first bit converter 16a matches the number of bits of the inputted merging-bit DSV data with the number of bits of the cumulative DSV data. The second bit converter 16b matches the number of bits of the inputted frame-signal DSV data after polarity evaluation with the number of bits of the cumulative DSV data. The first adder 16c adds up the output data from the first bit converter 16a and the output data from the second bit converter 16b. The second adder 16d adds up the cumulative DSV data and the output data from the first adder 16c. The output data from the second adder 16d is outputted to the overflow/underflow processor 18.

The overflow/underflow processor 18 receives the output data from the second adder 16d of the adding means 16. In the case where overflow or underflow has occurred in the received data, the overflow/underflow processor 18 performs exception handling with respect to the data and outputs it as new cumulative DSV data. To judge whether or not overflow or underflow has occurred in the received data, the overflow/underflow processor 18 has received the most significant bit (MSB) of the cumulative DSV data and the most significant bit (MSB) of the output data from the first adder 16c.

A description will be given below to the operation of the merging-bit DSV calculator 12.

The merging bits utilized in the EFM encoder is 3-bit data having any one of the four bit patterns of "000", "001", "010", and "100". The respective values of DSV thereof can be represented as "3", "1", "−1", and "−3" in decimal notation. The outputted merging-bit DSV data is represented by a 3-bit two's complement, which is "011", "001", "111", or "101".

However, the foregoing is the operation performed when the inputted cumulative polarity signal is "1." When the inputted cumulative polarity signal is "0," on the other hand, the respective values of DSV become "−3", "−1", "1", and "3", which have the same absolute values as those obtained when the inputted cumulative polarity signal is "1" and signs opposite to the signs thereof. As for the outputted merging-bit DSV data, it becomes "101", "111", "001", or "011".

However, since the least significant bit of the merging-bit DSV data is constantly "1", only the upper 2 bits of the merging-bit DSV data are outputted from the merging-bit DSV calculator 12 in the present embodiment.

When the merging bits are "000", the cumulative polarity is not inverted since the polarity of "H" or "L" is not inverted in either the leading bit or final bit of the merging bits. Consequently, the merging-bit DSV calculator 12 outputs the value of the inputted cumulative polarity signal as the provisional cumulative polarity signal.

When the merging bits are "001", "010", or "100", the cumulative polarity is inverted since the polarity of "H" or "L" is inverted in either the leading bit or final bit of the merging bits. Consequently, the merging-bit DSV calculator 12 outputs "0" as the provisional cumulative polarity signal when the inputted cumulative polarity signal is "1" and outputs "1" as the provisional cumulative polarity signal when the inputted cumulative polarity signal is "0".

A description will be given below to the operation of the frame-signal DSV/polarity evaluator 14.

Figure 4:
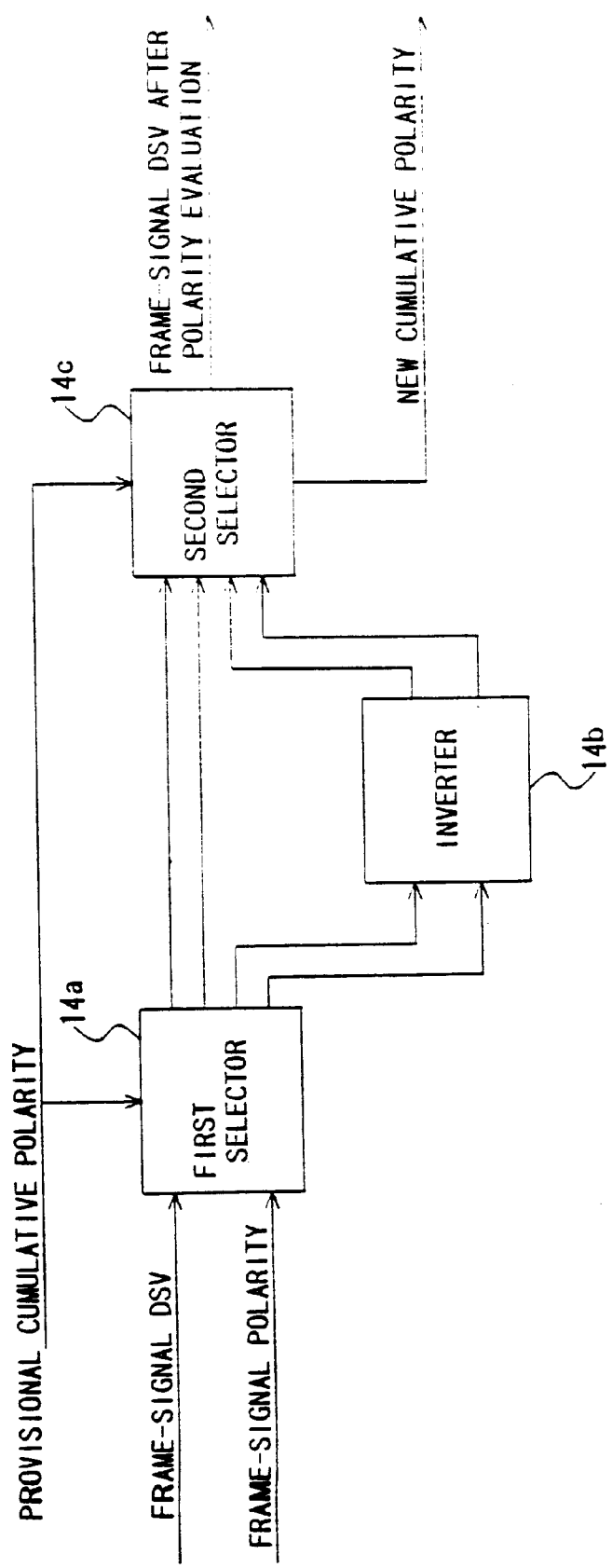
FIG. 4 is a block diagram showing the structure of a frame-signal DSV/polarity evaluator in the DSV calculator shown in FIG. 3.

FIG. 4 is a block diagram showing the internal structure of the frame-signal DSV/polarity evaluator 14. In the drawing are shown: a first selector 14a; an inverter 14b; and a second selector 14c.

The first selector 14a selects, based on the value of the provisional cumulative polarity signal, the destination of the inputted frame-signal DSV data and frame-signal polarity signal. When the provisional cumulative polarity signal is "1", the first selector 14a outputs the frame-signal DSV data and frame-signal polarity signal to the second selector 14c. When the provisional cumulative polarity signal is "0", on the other hand, the first selector 14a outputs the frame-signal DSV data and frame-signal polarity signal to the inverter 14b.

The inverter 14b outputs, upon receiving the frame-signal DSV data and frame-signal polarity signal, DSV data having the same absolute value as the above frame-signal DSV data and a sign opposite to the sign thereof to the second selector 14c, while outputting a polarity signal obtained by inverting "1" or "0" of the above frame-signal polarity signal to the second selector 14c.

The second selector 14c selects between the frame-signal DSV data and frame-signal polarity signal from the first selector 14a and the DSV data and polarity signal from the inverter 14b based on the value of the provisional cumulative polarity signal and receives the selected one. When the provisional cumulative polarity signal is "1", the second selector 14c receives the frame-signal DSV data and frame-signal polarity signal from the first selector 14a and outputs the frame-signal DSV data as frame-signal DSV data after polarity evaluation, while outputting the frame-signal polarity signal as new cumulative polarity signal. When the provisional cumulative signal is "0", on the other hand, the second selector 14c outputs the DSV data from the inverter 14b as frame-signal DSV data after polarity evaluation, while outputting the polarity signal from the inverter 14b as a new cumulative polarity signal.

A description will be given below to the first and second bit converters 16a and 16b of the adding means 16.

In the present embodiment, the merging-bit DSV data has been represented by 2 bits with a view to reducing the number of bits by utilizing the fact that the least significant bit of the 3 bits of the correct merging-bit DSV data is constantly "1".

On the other hand, the frame-signal DSV data has been represented by 4 bits. The value of DSV in a frame signal is any one of "8", "6", "4", "2", "0", "−2", "−4", "−6", and "−8" in compliance with the rule for EFM. To represent the value in binary notation, the total of 5 bits including 4 bits for data bits and 1 bit for a sign bit become necessary. In binary notation, the value of DSV is represented in any one of "01000", "00110", "00100", "00010", "00000", "11110", "11100", "11010", and "11000", in each of which the least significant bit is "0". By utilizing the fact, the present embodiment uses the upper 4 bits of the correct frame-signal DSV data as the frame-signal DSV data.

Figure 5A:
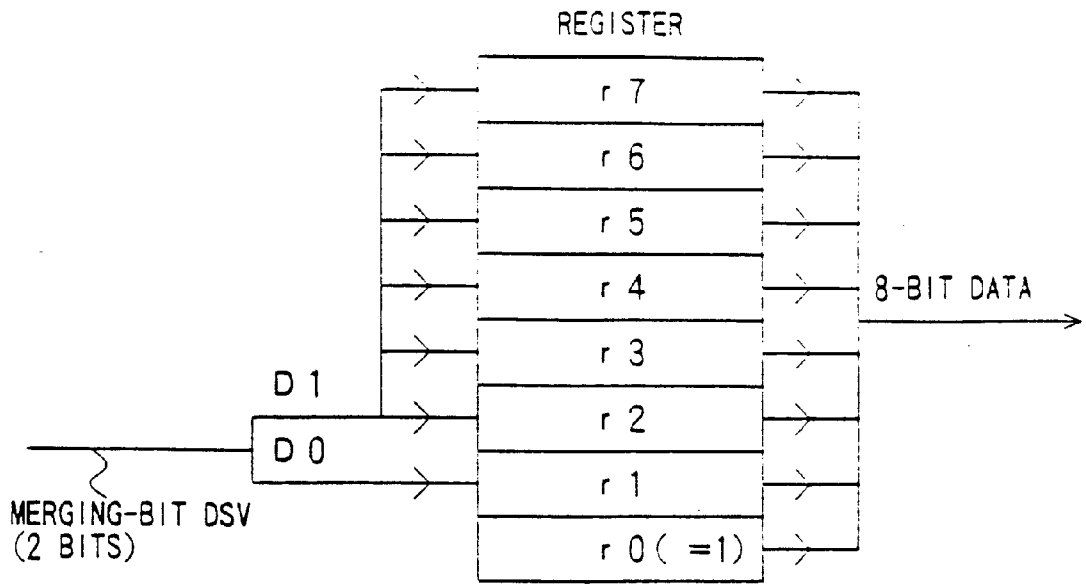
FIG. 5($a$) is a view showing the structure of a first bit converter in the DSV calculator shown in FIG. 3 and FIG. 5($b$) is a view showing the structure of a second bit converter in the DSV calculator shown in FIG. 3.

The first bit converter 16a is for converting the inputted 2-bit merging-bit DSV data to 8-bit data and is composed of, e.g., a single 8-bit register as shown in FIG. 5(a). In the drawing, the bit D0 of the merging-bit DSV data is stored in the bit r1 of the 8-bit register. The bit D1 of the merging-bit DSV data is stored in the bits r1 to r7 of the 8-bit register. In the bit r1 of the 8-bit register is constantly stored "1". The inputted 2-bit merging-bit DSV data is converted to 8-bit data having the same value in decimal notation when it is outputted from the 8-bit register.

Figure 5B:
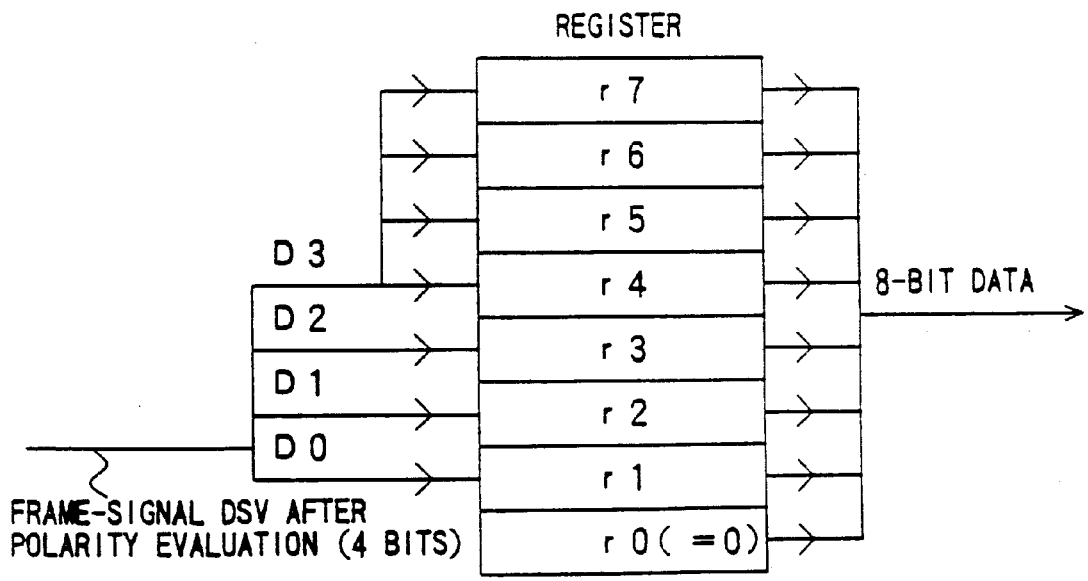

The second bit converter 16b is for converting the inputted 4-bit frame-signal DSV data after polarity evaluation to 8-bit data and is composed of, e.g., a single 8-bit register as shown in FIG. 5(b). In the drawing, the bit D0 of the frame-signal DSV data after polarity evaluation is stored in the bit r1 of the 8-bit register. Likewise, the bits D1, D2, and D3 are stored in the bits r2, r3, and r4 to r7, respectively. In the bit r0 of the 8-bit register is constantly stored "0". The inputted 4-bit frame-signal DSV data after polarity evaluation is converted to 8-bit data having the same value in decimal notation when it is outputted from the 8-bit register.

A description will be given to the overflow/underflow processor 18.

Figure 6:
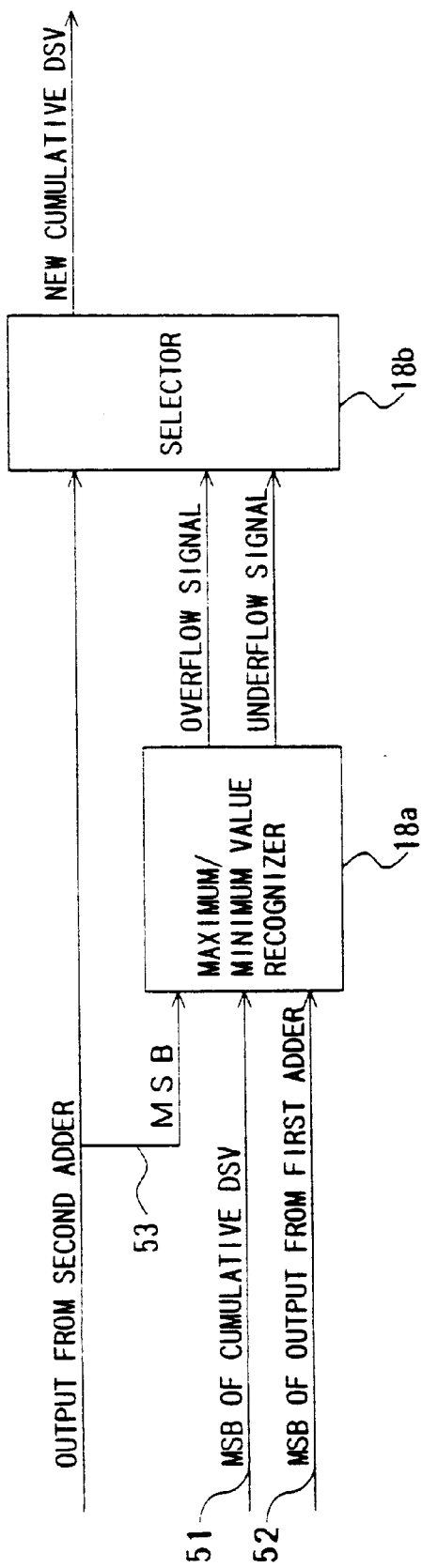
FIG. 6 is a block diagram showing the structure of an overflow/underflow processor in the DSV calculator shown in FIG. 3.

FIG. 6 is a view showing the internal structure of the overflow/underflow processor 18. In the drawing are shown: a maximum/minimum value recognizer 18a; a selector 18b; a most significant bit (MSB) 51 of cumulative DSV data; a most significant bit (MSB) 52 of the output data from the first adder 16c; and a most significant bit (MSB) 53 of the output data from the second adder 16d.

In the present embodiment, the cumulative DSV data is composed of 8 bits, whereby the decimal numbers of "−127" to "127" can be represented. The MSB of each data represents the sign of the data. If the MSB is "0", the data is positive. If the MSB is "1", the data is negative.

When overflow has occurred in the cumulative DSV data, i.e., when the value exceeds "127", the MSB shifts from "0" to "1". When underflow has occurred in the cumulative DSV data, i.e., when the value goes under −127, the MSB shifts from "1" to "0". By utilizing the fact, the overflow/underflow processor 18 determines whether or not overflow or underflow has occurred in new cumulative DSV data.

The maximum/minimum value recognizer 18a outputs "1" as an overflow signal when each of the MSB 51 of the cumulative DSV data and the MSB 52 of the output data from the first adder 16c is "0" (i.e., when each of the cumulative DSV data and the output data from the first adder 16c is positive) and when the MSB 53 of the output data from the second adder 16d is "1". In the other cases, the maximum/minimum value recognizer 18a outputs "0" as the overflow signal.

The maximum/minimum value recognizer 18a outputs "1" as an underflow signal when each of the MSB 51 of the cumulative DSV data and the MSB 52 of the output data from the first adder 16c is "1" (i.e., when each of the cumulative DSV data and the output data from the first adder 16c is negative) and when the MSB 53 of the output data from the second adder 16d is "0". In the other cases, the maximum/minimum value recognizer 18a outputs "0" as the underflow signal.

The selector 18b outputs "01111111" as the new cumulative DSV data upon receiving "1" as the overflow signal and outputs "10000000" as the new cumulative DSV data upon receiving "1" as the underflow signal. The selector 18*b* outputs the received output data from the second adder 16*d* as the new cumulative DSV data when each of the overflow signal and underflow signal is "0".

Thus, a DSV calculator which is small in circuit scale can be implemented by using the parallel method for DSV calculation, while utilizing the polarity evaluator for DSV of the frame signal and three types of data which are the cumulative DSV, DSV of the merging bits, and DSV of the frame signal.

In the case where overflow or underflow has occurred in the result of addition, the overflow/underflow processor performs exception handling with respect thereto, thereby improving the reliability of DSV calculation.

The DSV calculator can further be reduced in circuit scale by processing the merging-bit DSV as 2-bit data and processing the frame-signal DSV data as 4-bit data.

(Second Embodiment)

Figure 7:
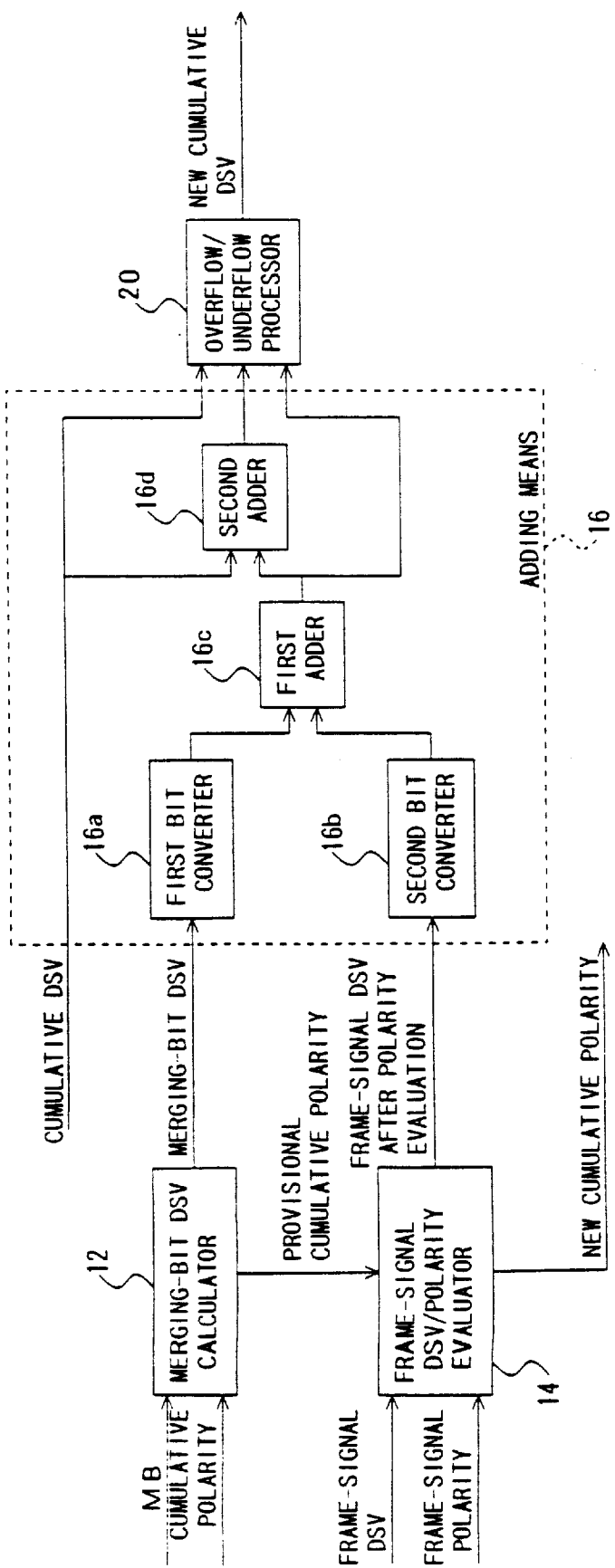
FIG. 7 is a block diagram showing the structure of a DSV calculator according to the second embodiment of the present invention.

FIG. 7 is a block diagram showing the structure of a DSV calculator according to another embodiment of the present invention. Here, the same components as used in the DSV calculator shown in FIG. 3 are designated by the same reference numerals and detailed description thereof is omitted. In the drawing is shown an overflow/underflow processor 20 which receives the output data from the first adder 16*c* of the adding means 16, the output data from the second adder 16*d* thereof, and the cumulative DSV data, determines whether or not overflow or underflow has occurred therein, and then outputs new cumulative DSV data.

In the present embodiment, it is assumed that the cumulative DSV data is represented by 8 bits. Hence, the maximum value of the cumulative DSV data becomes "127", while the minimum value thereof becomes "-128".

Figure 8:
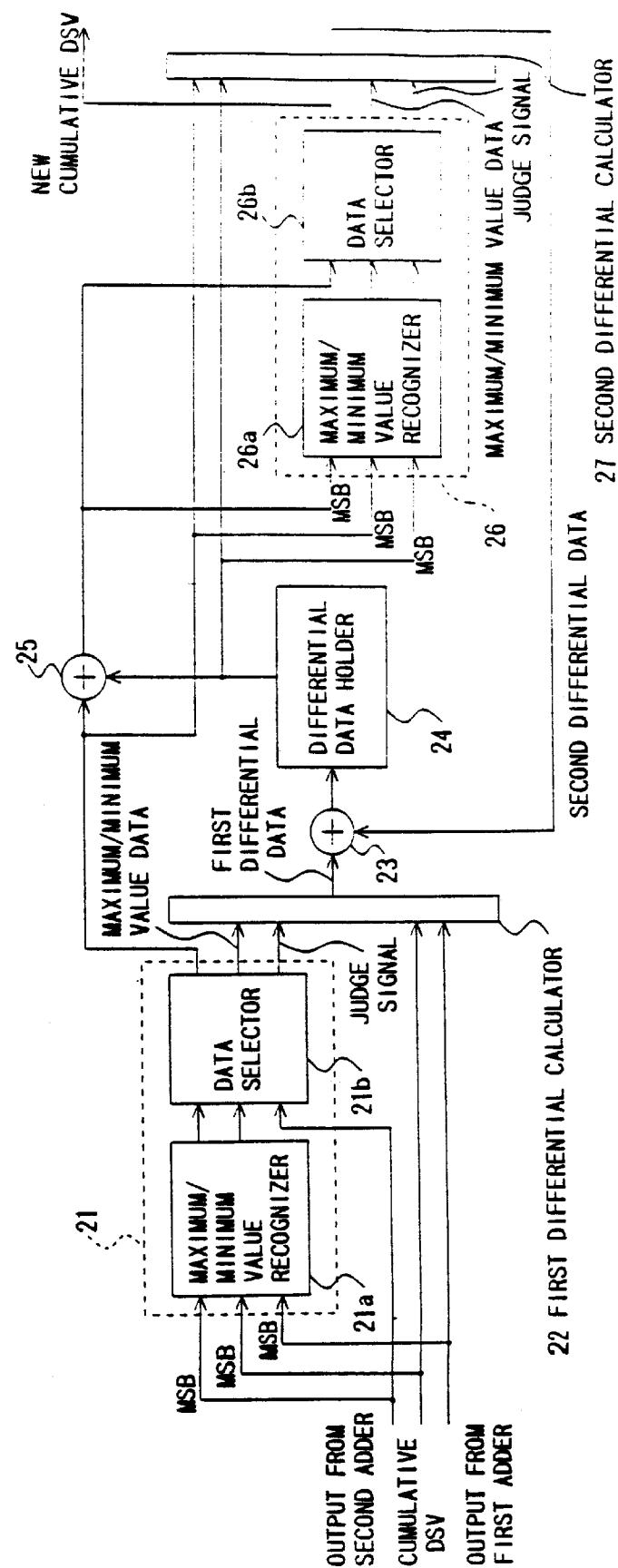
FIG. 8 is a block diagram showing the structure of an overflow/underflow processor in the DSV calculator shown in FIG. 7.

FIG. 8 is a block diagram showing the structure of the overflow/underflow processor 20. In the drawing are shown: a first judging element 21; a first differential calculator 22; a held data adder 23; a differential data holder 24; a differential adder 25; a second judging element 26; and a second differential calculator 27. The first judging element 21 consists of a maximum/minimum value recognizer 21*a* and a data selector 21*b*. The second judging element 26 consists of a maximum/minimum value recognizer 26*a* and a data selector 26*b*.

The first judging element 21 judges whether or not overflow or underflow has occurred in the output data from the second adder 26*d*. If overflow has occurred in the output data from the second adder 16*d*, the first differential calculator 22 calculates a difference between the output data from the second adder 16*d* and the maximum value of "127". If underflow has occurred in the output data from the second adder 16*d*, the first differential calculator 22 calculates a difference between the output data from the second adder 16*d* and the minimum value of "-128". In either case, the first differential calculator 22 outputs the result of calculation as first differential data.

The held data adder 23 adds up the first differential data and second differential data outputted from the second differential calculator 27 and causes the differential data holder 24 to hold the result of addition such that it is added in calculation of the following cumulative DSV data.

The differential adder 25 adds up the output data from the first judging element 21 and the differential data held in the differential data holder 24.

The second judging element 26 judges whether or not overflow or underflow has occurred in the output data from the differential adder 25. The output data from the second judging element 26 is outputted as the new cumulative DSV data. If overflow has occurred in the output data from the differential adder 25, the second differential calculator 27 calculates a difference between the output data from the differential adder and the maximum value of "127". If underflow has occurred in the output data from the differential adder 25, the second differential calculator 27 calculates a difference between the output data from the differential adder 25 and the minimum value of "-128". In either case, the second differential calculator 27 outputs the result of calculation as the second differential data to the held data adder 23.

The operation of the overflow/underflow processor 20 shown in FIG. 8 will be described by taking, as an example, the case where overflow has occurred in the cumulative DSV data.

First, a description will be given to a first example of the operation. The following Table 1 shows variations in individual data in the first example of the operation.

TABLE 1

|  | A | B | C | D |
| --- | --- | --- | --- | --- |
| Cumulative DSV | — | 127 | 123 | 127 |
| Output from First Adder | — | -7 | +6 | -5 |
| Output from Second Adder | 130 | 120 | 129 | 122 |
| Output from First Judging Element | 127 | 120 | 127 | 122 |
| First Differential Data | 3 | 0 | 2 | 0 |
| Held Differential Data | 0 | 3 | 0 | 2 |
| Output from Differential Adder | 127 | 123 | 127 | 124 |
| Output from Second Judging Element (New Cumulative DSV) | 127 | 123 | 127 | 124 |
| Second Differential Data | 0 | 0 | 0 | 0 |

First, it is assumed that "130" has been obtained as the output data from the second adder 16*d* (row A). It is also assumed that the differential data holder 24 has held "0". In this case, the first judging element 21 judges that overflow has occurred in the output data from the second adder 16*d* and outputs "127" as the maximum/minimum data to the first differential calculator 22, while notifying the first differential calculator 22 that overflow has occurred in the output data from the second adder 16*d* by means of a judge signal. The first judging element 21 also outputs "127" to the differential adder 25.

Upon receiving the judge signal, the first differential calculator 22 recognizes the overflow having occurred in the output data from the second adder 16*d*, calculates "3" as the first differential data based on the maximum/minimum value data, on the cumulative DSV data, and on the output from the first adder 16*c*, and outputs it to the held data adder 23.

The differential adder 25 adds up "127" as the output data from the first judging element 21 and the differential data held in the differential data holder 24. However, since the differential data held in the differential data holder 24 is "0", the differential adder 25 outputs "127". Since overflow has not occurred in the output data from the differential adder 25, the second judging element 26 does not output data to the second differential calculator 27 but outputs "127" as the new cumulative DSV data. Since the second differential data outputted from the second differential calculator 27 is "0", the held data adder 23 outputs "3" to the differential data holder 24 such that it is held therein.

Next, it is assumed that the output data from the first adder 16*c* is "-7" (row B). In this case, the output data from the second adder 16*d* is "120" and, since overflow has not occurred in the output data from the second adder 16*d*, the first judging element 21 does not output data to the first differential calculator 22 but outputs "120" to the differential adder 25. The first differential data outputted from the first differential calculator 22 is "0".

The differential adder 25 adds up "120" outputted from the first judging element 21 and "3" held in the differential data holder 24 and outputs "123" to the second judging element 26. Since overflow has not occurred in the output data from the differential adder 25, the second judging element 26 does not output data to the second differential calculator 27 but outputs "123" as the new cumulative DSV data. Since the second differential data outputted from the second differential calculator 27 is "0", the held data adder 23 outputs "0" to the differential data holder 24 such that it is held therein.

Next, it is assumed that the output data from the first adder 16*c* is "+6" (row C). In this case, since the output data from the second adder 16*d* is "129", the first judging element 21 judges that overflow has occurred in the output data from the second adder 16*d* and outputs "127" as the maximum/minimum value data to the first differential calculator 22, while notifying the first differential calculator 22 that overflow has occurred in the output data from the second adder 16*d* by means of a judge signal. The first judging element 21 also outputs "127" to the differential adder 25.

Upon receiving the judge signal, the first differential calculator 22 recognizes the overflow having occurred in the output data from the second adder 16*d*, calculates "2" as the first differential data based on the maximum/minimum value data, on the cumulative DSV data, and on the output data from the first adder 16*c*, and outputs the result of calculation to the held data adder 23.

The differential adder 25 adds up "127" as the outputs data from the first judging element 21 and the differential data held in the differential data holder 24 and outputs "127", since the differential data held in the differential data holder 24 is "0". Since overflow has not occurred in the output data from the differential adder 25, the second judging element 26 does not output data to the second differential calculator 27 but outputs "127" as the new cumulative DSV data. Since the second differential data outputted from the second differential calculator 27 is "0", the held data adder 23 outputs "2" to the differential data holder 24 such that it is held therein.

Next, it is assumed that the output data from the first adder 16*c* is "−5" (row D).

In this case, the output data from the second adder 16*d* is "122" and, since overflow has not occurred in the output data from the second adder 16*d*, the first judging element 21 does not output data to the first differential calculator 22 but outputs "122" to the differential adder 25. The first differential data outputted from the first differential calculator 22 is "0".

The differential adder 25 adds up "122" as the output data from the first judging element 21 and "2" held in the differential data holder 24 and outputs "124" to the second judging element 26. Since overflow has not occurred in the output data from the differential adder 25, the second judging element 26 does not output data to the second differential calculator 27 but outputs "124" as the new cumulative DSV data. Since the second differential data outputted from the second differential calculator 27 is "0", the held data adder 23 outputs "0" to the differential data holder 24.

Figure 9:
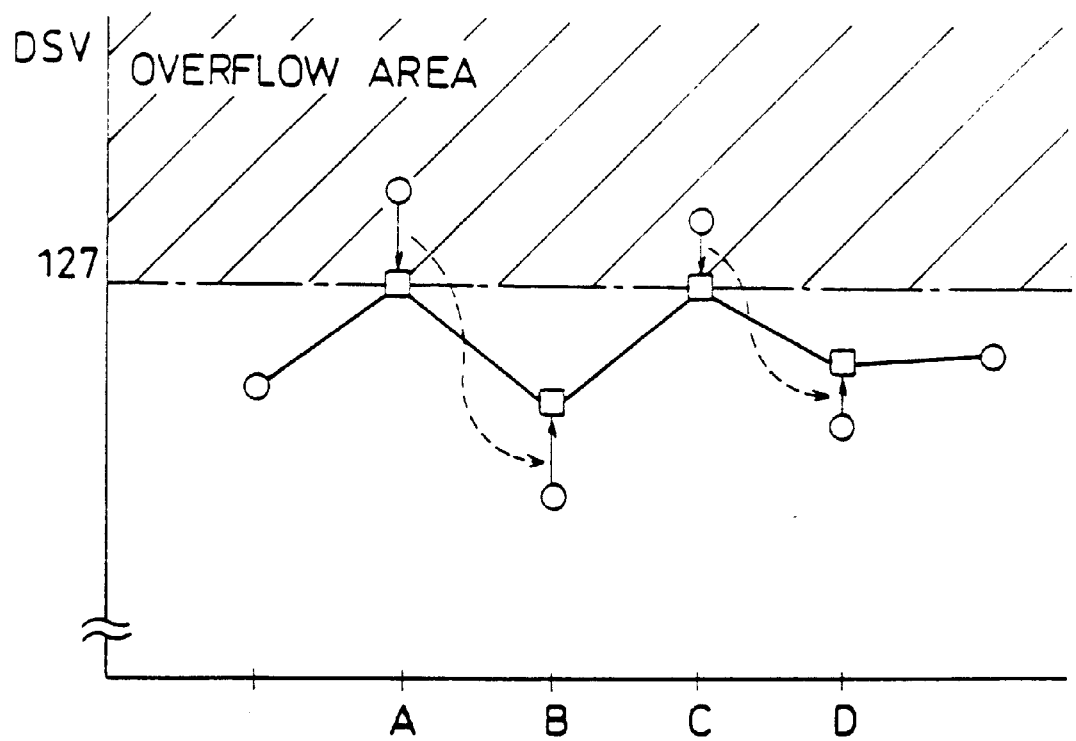
FIG. 9 is a graph showing a variation in data in a first example of the operation of the overflow/underflow processor shown in FIG. 8.

FIG. 9 is a graph showing variations in data in the first example of the operation. In the drawing, the symbol ○ represents the output data from the second adder 16*d* and the symbol □ represents the output data from the second judging element 26 or the new cumulative DSV data. It will be understood from the drawing that, even when the output data from the second adder 16*d* exceeds the maximum value of "127" and hence overflow occurs therein, the differential data therebetween is added in calculation of the new cumulative DSV data in the subsequent frame signal.

Thus, even when overflow has occurred in the output data from the second adder 16*d*, the data on the difference therebetween is held in the differential data holder 24 and is added when the output data from the second adder 16*d* goes under the maximum value, so that accurate cumulative DSV data can be obtained.

Next, a description will be given to a second example of the operation. The following Table 2 shows variations in individual data in the second example of the operation.

TABLE 2

|  | A | B | C | D |
| --- | --- | --- | --- | --- |
| Cumulative DSV | — | 127 | 127 | 127 |
| Output from First Adder | — | −2 | −2 | −5 |
| Output from Second Adder | 132 | 125 | 125 | 122 |
| Output from First Judging Element | 127 | 125 | 125 | 122 |
| First Differential Data | 5 | 0 | 0 | 0 |
| Held Differential Data | 0 | 5 | 3 | 1 |
| Output from Differential Adder | 127 | 130 | 128 | 123 |
| Output from Second Judging Element (New Cumulative DSV) | 127 | 127 | 127 | 123 |
| Second Differential Data | 0 | 3 | 1 | 0 |

First, it is assumed that "132" has been obtained as the output data from the second adder 16*d* (row A). It is also assumed that the differential data holder 24 has held "0". In this case, the first judging element 21 judges that overflow has occurred in the output data from the second adder 16*d* and outputs "127" as the maximum/minimum value data to the first differential calculator 22, while notifying the first differential calculator 22 that overflow has occurred in the output data from the second adder 16*d* by means of a judge signal. The first judging element 21 also outputs "127" to the differential adder 25.

Upon receiving the judge signal, the first differential calculator 22 recognizes that overflow has occurred in the output data from the second adder 16*d*, calculates "5" as the first differential data based on the maximum/minimum value data, on the cumulative DSV data, and on the output data from the first adder 16*c*, and outputs it to the held data adder 23.

The differential adder 25 adds up "127" as the output data from the first judging element 21 and the differential data held in the differential data holder 24 and outputs "127", since the differential data held in the differential data holder 24 is "0". Since overflow has not occurred in the output data from the differential adder 25, the second judging element 26 does not output data to the second differential calculator 27 but outputs "127" as the new cumulative DSV data. Since the second differential data outputted from the second differential calculator 27 is "0", the held data adder 23 outputs "5" to the differential data holder 24.

Next, it is assumed that the output data from the first adder 16*c* is "−2" (row B). In this case, the output data from the second adder 16*d* is "125" and, since overflow has not occurred in the output data from the second adder 16*d*, the first judging element 21 does not output data to the first differential calculator 22 but outputs "125" to the differential adder 25. The first differential data outputted from the first differential calculator 22 is "0".

The differential adder 25 adds up "125" outputted from the first judging element 21 and "5" held in the differential data holder 24 and outputs "130" to the second judging element 26. The second judging element 26 judges that overflow has occurred in the output data from the differential calculator 25 and outputs "127" as the maximum/minimum value data to the second differential calculator 27, while notifying the second differential calculator 27 that overflow has occurred in the output data from the differential adder 25 by means of a judge signal. The second judging elements 26 also outputs "127" as the new cumulative DSV data.

Upon receiving the judge signal, the second differential calculator 27 recognizes the overflow having occurred in the output data from the differential adder 25, calculates "3" as the second differential data based on the output data from the first judging element 21, on the data held in the differential data holder 24, and on the output data from the differential adder 25, and outputs it to the held data adder 23. The held data adder 23 outputs "3" to the differential data holder 24.

Next, it is assumed that the output data from the first adder 16c is "−2" (row C). In this case, the output data from the second adder 16d is "125" and, since overflow has not occurred in the output data from the second adder 16d, the first judging element 21 does not output data to the first differential calculator 22 but outputs "125" to the differential adder 25. The first differential data outputted from the first differential calculator 22 is "0".

The differential adder 25 adds up "125" outputted from the first judging element 21 and "3" held in the differential data holder 24 and outputs "128" to the second judging element 26. The second judging element 26 judges that overflow has occurred in the output data from the differential adder 25 and outputs "127" as the maximum/minimum value data to the second differential calculator 27, while notifying the second differential calculator 27 that overflow has occurred in the output data from the differential adder 25 by means of a judge signal. The second judging element 26 also outputs "127" as the new cumulative DSV data.

Upon receiving the judge signal, the second differential calculator 27 recognizes the overflow having occurred in the output data from the differential adder 25, calculates "1" as the second differential data based on the output data from the first judging element 21, on the data held in the differential data holder 24, and on the output data from the differential adder 25, and outputs it to the held data adder 23. The held data adder 23 outputs "1" to the differential data holder 24.

Next, it is assumed that the output data from the first adder 16c is "−5" (row D). In this case, the output data from the second adder 16d is "122" and, since overflow has not occurred in the output data from the second adder 16d, the first judging element 21 does not output data to the first differential calculator 22 but outputs "122" to the differential adder 25. The first differential data outputted from the first differential calculator 22 is "0".

The differential adder 25 adds up "122" outputted from the first judging element 21 and "1" held in the differential data holder 24 and outputs "123" to the second judging element 26. Since overflow has not occurred in the output data from the differential adder 25, the second judging element 26 does not output data to the second differential calculator 27 but outputs "123" as the new cumulative DSV data. Since the second differential data outputted from the second differential calculator 27 is "0", the held data adder 23 outputs "0" to the differential data holder 24.

Figure 10:
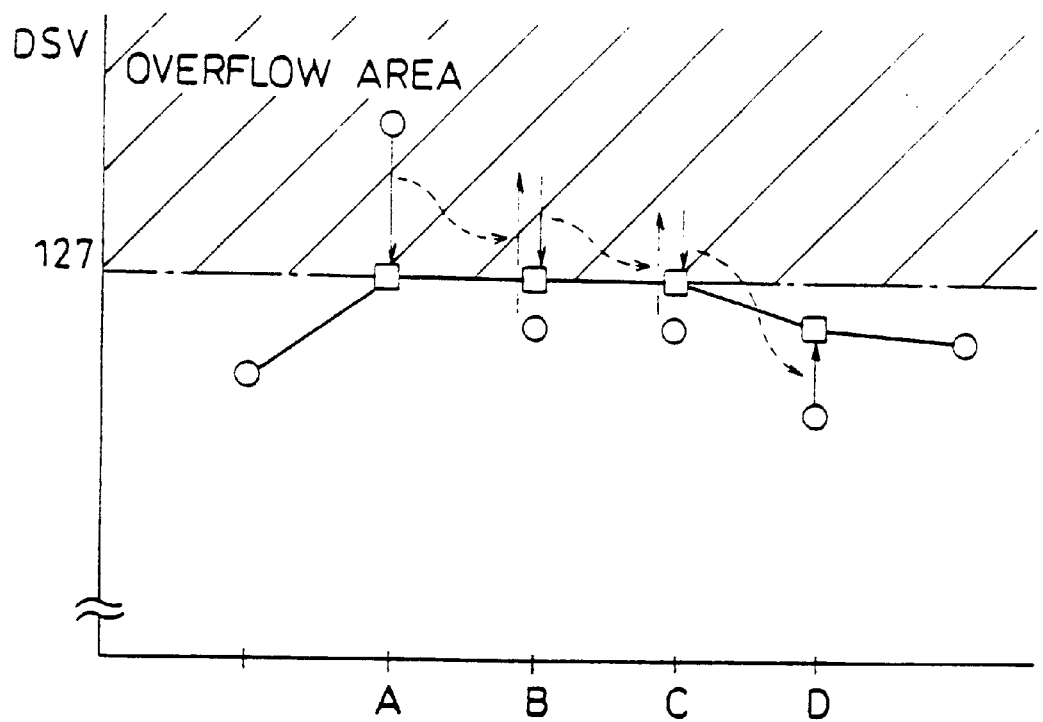
FIG. 10 is a graph showing a variation in data in a second example of the operation of the overflow/underflow processor shown in FIG. 8.

FIG. 10 is a graph showing variations in data in a second example of the operation. In the drawing, the symbol ○ represents the output data from the second adder 16d and the symbol □ represents the output data from the second judging element 26 or the new cumulative DSV data. It will be understood from the drawing that, even when the output data from the second adder 16d exceeds the maximum value of "127" and hence overflow occurs therein, the differential data is added in calculation of the subsequent cumulative DSV data. It will also be understood from the drawing that, even when overflow has occurred as a result of adding the differential data, the differential data therebetween is added in calculation of the subsequent cumulative DSV data.

Thus, even when overflow has occurred in the output data from the second adder 16d, the data on the difference therebetween is held in the differential data holder 24 and is added when the output data from the second adder 16d goes under the maximum value of "127". Furthermore, even when overflow has occurred in data representing the result of addition, the data on the difference therebetween is held in the differential data holder 24 and is added when the output data from the second adder 16d goes under the maximum value of "127", so that accurate cumulative DSV data can be obtained.

Next, a description will be given to a third example of the operation. The following Table 3 shows variations in individual data in the third example of the operation.

TABLE 3

|  | A | B | C | D | E |
| --- | --- | --- | --- | --- | --- |
| Cumulative DSV | — | 127 | 127 | 127 | 127 |
| Output from First Adder | — | +3 | +3 | +3 | −15 |
| Output from Second Adder | 130 | 130 | 130 | 130 | 112 |
| Output from First Judging Element | 127 | 127 | 127 | 127 | 112 |
| First Differential Data | 3 | 3 | 3 | 3 | 0 |
| Held Differential Data | 0 | 3 | 6 | 9 | 12 |
| Output from Differential Adder | 127 | 130 | 133 | 136 | 124 |
| Output from Second Judging Element (New Cumulative DSV) | 127 | 127 | 127 | 127 | 124 |
| Second Differential Data | 0 | 3 | 6 | 9 | 0 |

First, it is assumed that "130" is obtained as the output data from the second adder 16d (row A). It is also assumed that the differential data holder 24 has held "0". In this case, the first judging element 21 judges that overflow has occurred in the output data from the second adder 16d and transmits a judge signal indicating the result of judgment to the first differential calculator 22, while outputting "127" as the maximum/minimum value data. The first judging element 21 also outputs "127" to the differential adder 25.

Upon receiving the judge signal, the first differential calculator 22 recognizes the overflow having occurred in the output data from the second adder 16d, calculates "3" as the first differential data based on the maximum/minimum value data, on the cumulative DSV data, and on the output data from the first adder 16c, and outputs it to the held data adder 23.

The differential adder 25 adds up "127" as the output data from the first judging element 21 and the differential data held in the differential data holder 24 and outputs "127", since the differential data held in the differential data holder 24 is "0". Since overflow has not occurred in the output data from the differential adder 25, the second judging element 26 does not output data to the second differential calculator 27 but outputs "127" as the new cumulative DSV data. Since the second differential data outputted from the second differential calculator 27 is "0", the held data adder 23 outputs "3" to the differential data holder 24.

Next, it is assumed that the output data from the first adder 16c is "+3" (row B). In this case, the output data from the second adder 16d is "130" and the first judging element 21 judges that overflow has occurred in the output data from the second adder 16d and transmits a judge signal indicating the result of judgment to the first differential calculator 22, while outputting "127" as the maximum/minimum value. The first judging element 21 also outputs "127" to the differential adder 25.

Upon receiving the judge signal, the first differential calculator 22 recognizes the overflow having occurred in the output data from the second adder 16d, calculates "3" as the first differential data based on the maximum/minimum value data, on the cumulative DSV data, and on the output data from the first adder 16c, and outputs it to the held data adder 23.

The differential adder 25 adds up "127" outputted from the first judging element 21 and "3" held in the differential data holder 24 and outputs "130" to the second judging element 26. The second judging element 26 judges that overflow has occurred in the output data from the differential adder 25 and transmits a judge signal indicating the result of judgment to the second differential calculator 27, while outputting "127" as the maximum/minimum value data. The second judging element 26 also outputs "127" as the new cumulative DSV data.

Upon receiving the judge signal, the second differential calculator 27 recognizes the overflow having occurred in the output data from the differential adder 25, calculates "3" as the second differential data based on the output data from the first judging element 21, on the data held in the differential data holder 24, and on the output data from the differential adder 25, and outputs it to the held data adder 23. The held data adder 23 adds up "3" as the first differential data and "3" as the second differential data and outputs "6" as the result of addition to the differential data holder 24.

Next, it is assumed that the output data from the first adder 16c is "+3" (row C). In this case, since the output data from the second adder 16d is "130", the first judging element 21 judges that overflow has occurred in the output data from the second adder 16d and transmits a judge signal indicating the result of judgment to the first differential calculator 22, while outputting "127" as the maximum/minimum value data. The first judging element 21 also outputs "127" to the differential adder 25.

Upon receiving the judge signal, the first differential calculator 22 recognizes the overflow having occurred in the output data from the second adder 16d, calculates "3" as the first differential data based on the maximum/minimum value data, on the cumulative DSV data, and on the output data from the first adder 16c, and outputs it to the held data adder 23.

The differential adder 25 adds up "127" outputted from the first judging element 21 and "6" held in the differential data holder 24 and outputs "133" to the second judging element 26. The second judging element 26 judges that overflow has occurred in the output data from the differential adder 25 and transmits a judge signal indicating the result of judgment to the second differential calculator 27, while outputting "127" as the maximum/minimum value data. The second judging element 26 also outputs "127" as the new cumulative DSV data.

Upon receiving the judge signal, the second differential calculator 27 recognizes the overflow having occurred in the output data from the differential adder 25, calculates "6" as the second differential data based on the output data from the first judging element 21, on the data held in the differential data holder 24, and on the output data from the differential adder 25, and outputs it to the held data adder 23. The held data adder 23 adds up "3" as the first differential data and "6" as the second differential data and outputs "9" as the result of addition to the differential data holder 24.

Next, it is assumed that the output data from the first adder 16c is "+3" (row D). In this case, since the output data from the second adder 16d is "130", the first judging element 21 judges that overflow has occurred in the output data from the second adder 16d and transmits a judge signal indicating the result of judgment to the first differential calculator 22, while outputting "127" as the maximum/minimum value data. The first judging element 21 also outputs "127" to the differential adder 25.

Upon receiving the judge signal, the first differential calculator 22 recognizes the overflow having occurred in the output data from the second adder 16d, calculates "3" as the first differential data based on the maximum/minimum value data, on the cumulative DSV data, and on the output data from the first adder 16c, and outputs it to the held data adder 23.

The differential adder 25 adds up "127" outputted from the first judging element 21 and "9" held in the differential data holder 24 and outputs "136" to the second judging element 26. The second judging element 26 judges that overflow has occurred in the output data from the differential adder 25 and transmits a judge signal indicating the result of judgment to the second differential calculator 27, while outputting "127" as the maximum/minimum value data. The second judging element 26 also outputs "127" as the new cumulative DSV data.

Upon receiving the judge signal, the second differential calculator 27 recognizes that overflow has occurred in the output data from the differential adder 25, calculates "9" as the second differential data based on the output data from the first judging element 21, on the data held in the differential data holder 24, and on the output data from the differential adder 25, and outputs it to the held data adder 23. The held data adder 23 adds up "3" as the first differential data and "9" as the second differential data and outputs "12" as the result of addition to the differential data holder 24.

Next, it is assumed that "−15" has been obtained as the output data from the first adder 16c (row E). In this case, since the output data from the second adder 16d is "112" and hence overflow has not occurred in the output data from the second adder 16d, the first judging element 21 does not output data to the first differential calculator 22 but outputs "112" as it is to the differential calculator 25. The first differential data outputted from the first differential adder 22 is "0".

The differential adder 25 adds up "112" outputted from the first judging element 21 and "12" held in the differential data holder 24 and outputs "124" to the second judging element 26. Since overflow has not occurred in the output data from the differential adder 25, the second judging element 26 does not output data to the second differential calculator 27 but outputs "124" as the new cumulative DSV data. Since the second differential data outputted from the second differential calculator 27 is "0", the held data adder 23 outputs "0" to the differential data holder 24.

Figure 11:
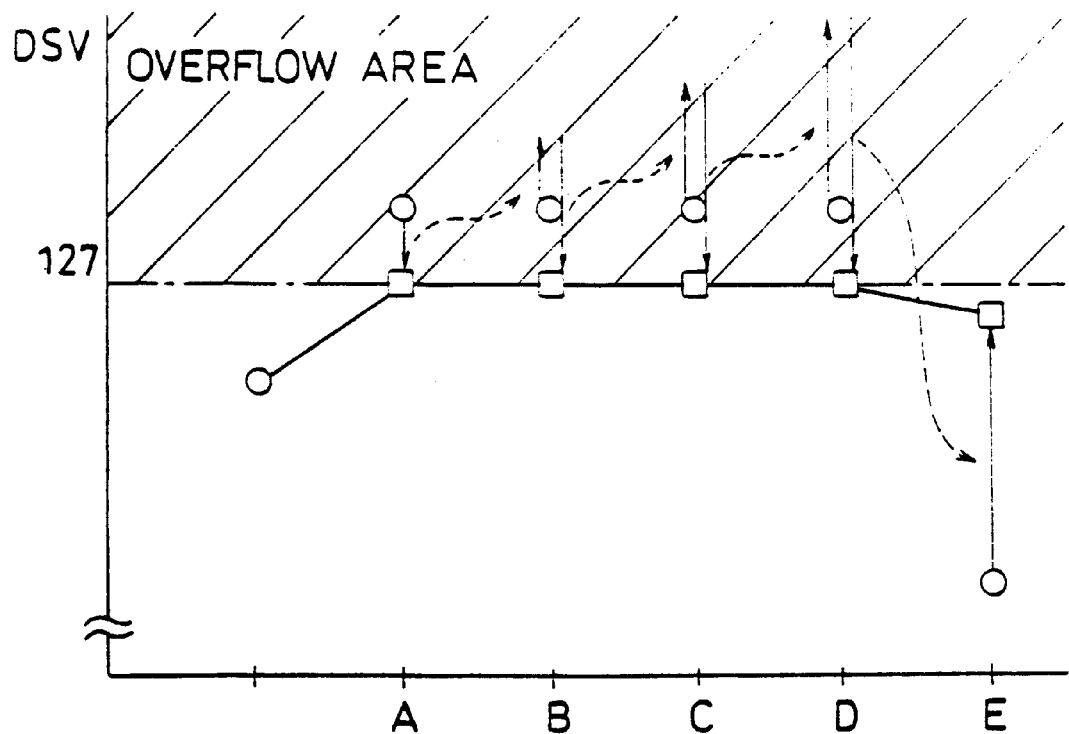
FIG. 11 is a graph showing a variation in data in a third example of the operation of the overflow/underflow processor shown in FIG. 8.

FIG. 11 is a graph showing variations in data in the third example of the operation. In the drawing, the symbol ○ represents the output data from the second adder 16d and the symbol □ represents the output data from the second judging element 26 or the new cumulative DSV data. It will be understood from the drawing that, even when the output data from the second adder 16d exceeds the maximum value of "127" and hence overflow occurs therein, the differential data therebetween is accumulated and added in calculation of the subsequent cumulative DSV data.

Thus, even when overflow has consecutively occurred in the output data from the second adder 16d, the data on the difference therebetween is accumulated and held in the differential data holder 24 and is added when the output data from the second adder 16d goes under the maximum value of "127", so that accurate cumulative DSV data can be obtained.

The structure of the first and second judging elements 21 and 26 will be described below in greater detail. Since the first and second judging elements 21 and 26 are implemented by the same structure, a description will be given to the first judging element 21 as the representative.

To the maximum/minimum value recognizer 21a are inputted the most significant bit (MSB) of the output data from the first adder 16c and the MSB of the output data from the second adder 16d. When each of the MSB of the cumulative DSV data and the MSB of the output data from the first adder 16c is "0" and the MSB of the output data from the second adder 16d is "1", the maximum/minimum value recognizer 21a recognizes that overflow has occurred in the cumulative DSV data and outputs an overflow signal to the data selector 21b. On the other hand, when each of the MSB of the cumulative DSV data and the MSB of the output data from the first adder 16c is "1" and the MSB of the output data from the second adder 16d is "0", the maximum/minimum value recognizer 21a recognizes that underflow has occurred in the cumulative DSV data and outputs an underflow signal to the data selector 21b.

When the data selector 21b has not received either of the overflow signal and the underflow signal, it outputs the output data from the second adder 16d as it is to the differential adder 25. When the data selector 21b has received the overflow signal, it outputs "127" to the differential adder 25, notifies the first differential calculator 22 of the overflow by means of a judge signal, and outputs "127" as the maximum/minimum value data. When the data selector 21b has received the underflow signal, it outputs "−128" to the differential adder 25, notifies the first differential calculator 22 of the underflow by means of a judge signal, and outputs "−128" as the maximum/minimum value data.

The structure of the first and second differential calculators 22 and 27 will be described below in greater detail. Since the first and second differential calculator 22 and 27 are implemented by the same structure, a description will be given to the first differential calculator 22 as the representative.

Figure 12:
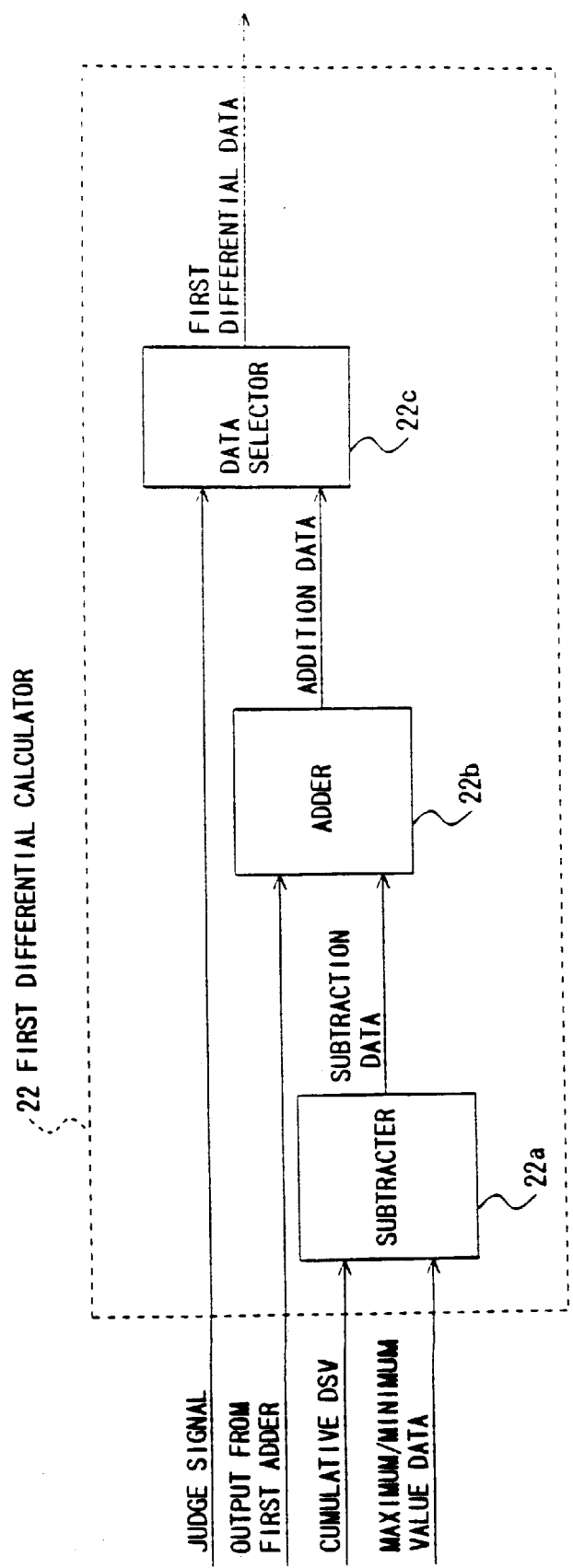
FIG. 12 is a block diagram showing the structure of a first differential calculator in the overflow/underflow processor shown in FIG. 8.
Figure 13:
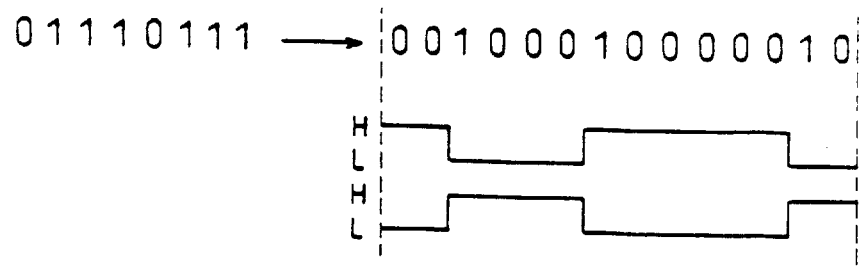
FIG. 13($a$) shows a part of a translation table used in EFM and a signal waveform presented by EFM-modulated data and FIG. 13($b$) illustrates a method of selecting merging bits based on the value of DSV.
Figure 13:
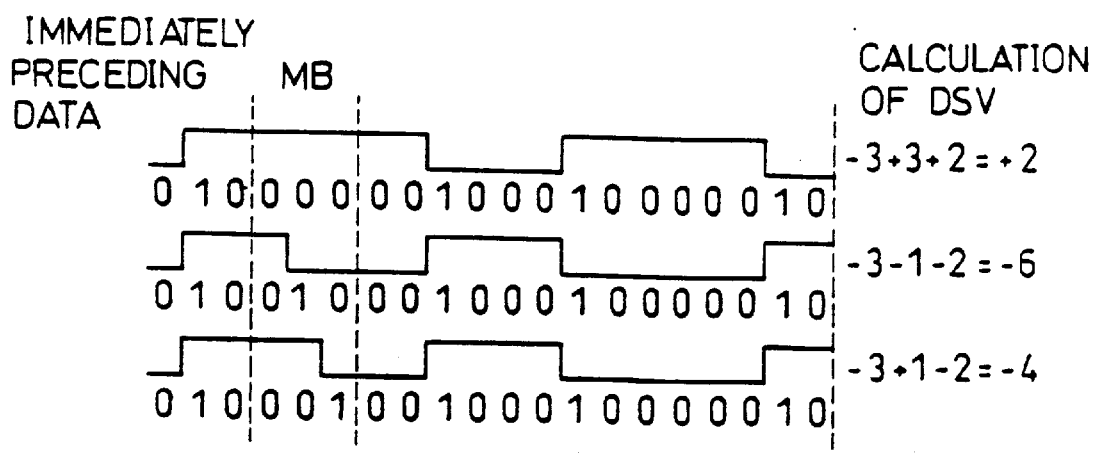
Figure 14A:
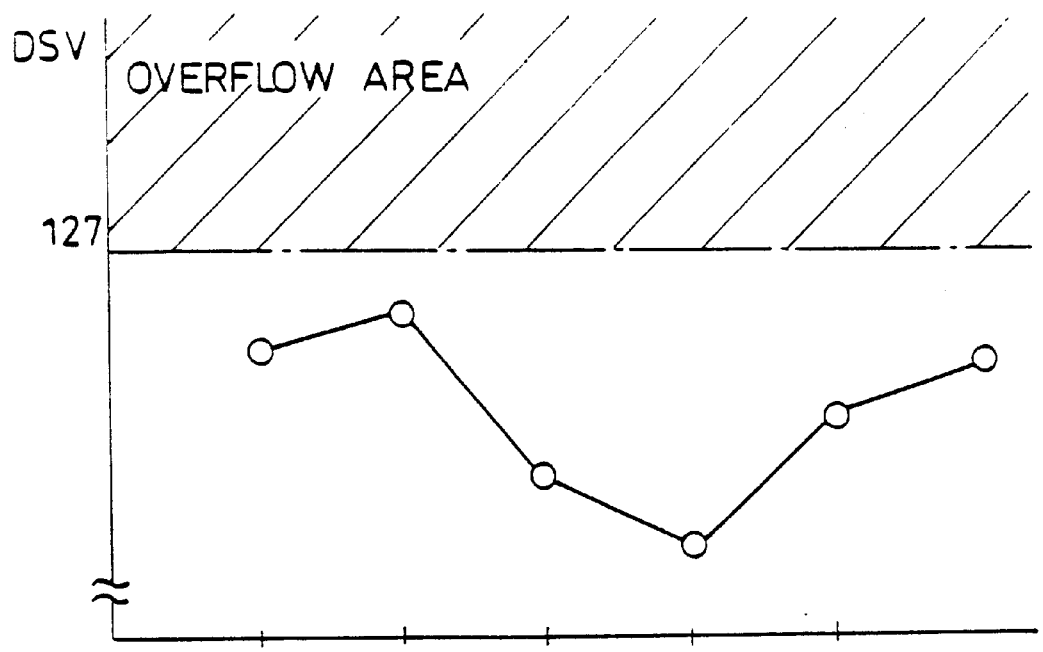
FIG. 14 are graphs each showing a variation in cumulative-DSV data, of which FIG. 14($a$) shows the case where overflow has not occurred and FIG. 14($b$) shows the case where overflow has occurred.
Figure 14B:
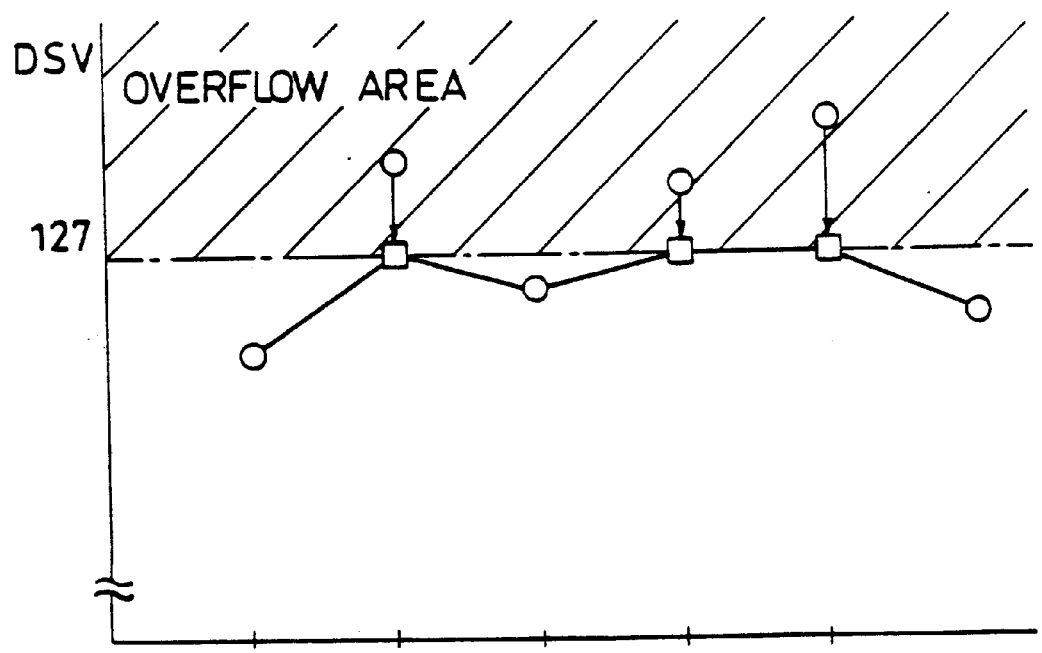

FIG. 12 is a block diagram showing the structure of the first differential calculator 22 shown in FIG. 8. In FIG. 12 are shown: a subtracter 22a; an adder 22b; and a data selector 22c.

When overflow has occurred in the output data from the second adder 16d, the subtracter 22a calculates a difference between the cumulative DSV data and "127" as the maximum value data and outputs it as subtraction data. The adder 22b calculates the sum of the subtraction data outputted from the subtracter 22a and the output data from the first adder 16c and outputs it as addition data. On the other hand, when underflow has occurred in the output data from the second adder 16d, the subtracter 22a calculates a difference between the cumulative-DSV data and "−128" as the minimum value data and outputs it as subtraction data. The adder 22b calculates the sum of the subtraction data outputted from the subtracter 22a and the output data from the first adder 16c and outputs it as addition data.

When the data selector 22c recognizes, upon receiving the judge signal, that overflow or underflow has occurred in the output data from the second adder 16d, it outputs the addition data outputted from the adder 22b as the first differential data. When neither overflow nor underflow has occurred in the output data from the second adder 16d, the data selector 22c outputs "0" as the first differential data.

Thus, since the first and second judging elements 21 and 26 and the first and second differential calculators 22 and 27 can be implemented by the respective simple structures, the overflow/underflow processor 20 can be implemented by a structure which is small in circuit scale.

We claim:

1. An EFM (Eight to Fourteen Modulation) encoder comprising:

a merging-bit selector for selecting merging-bit data which connects to each other any adjacent two of a plurality of frame signals sequentially inputted, said merging-bit selector having a DSV calculator for calculating DSV (Digital Sum Variation) as an index for selecting the optimum merging-bit data for each frame signal and for each merging-bit data;

said merging-bit selector further comprising:

a merging-bit generator for generating, for each of the inputted frame signals, the merging-bit data which connects said frame signal as a first frame signal to a second frame signal immediately preceding the first frame signal;

said DSV calculator having a function of receiving frame-signal DSV data representing a value of DSV of the first frame signal, a frame-signal polarity signal indicating whether or not polarity inversion has occurred in a leading bit or final bit of the first frame signal, cumulative DSV data representing a value of DSV up to the second frame signal, and a cumulative polarity signal indicating a polarity in a final bit of the second frame signal, calculating DSV based on said frame-signal DSV data, on said frame-signal polarity signal, on said cumulative DSV data, on said cumulative polarity signal, and on the merging-bit data generated by said merging-bit generator, generating new cumulative DSV data representing a value of DSV up to the first frame signal and a new cumulative polarity signal indicating a polarity in the final bit of the first frame signal, and outputting them;

said DSV calculator further comprising:

a merging-bit DSV calculator which receives said merging-bit data and said cumulative polarity signal and outputs merging-bit DSV data representing a value of DSV of said merging-bit data and a provisional cumulative polarity signal indicating a polarity in a final bit of said merging-bit data when said merging-bit data is connected to the second frame signal;

a frame-signal DSV/polarity evaluator which receives said frame-signal DSV data, said frame-signal polarity signal, and said provisional cumulative polarity signal outputted from said merging-bit DSV calculator, substitutes frame-signal DSV data after polarity evaluation for said frame-signal DSV data in consideration of a polarity of said provisional cumulative polarity signal, and outputs the frame-signal DSV data after evaluation, while outputting, as said new cumulative polarity signal, a signal indicating a polarity in the final bit of the first frame signal when said frame signal is connected to the second frame signal via said merging-bit data;

adding means for adding up said cumulative DSV data, said merging-bit DSV data outputted from said merging-bit DSV calculator, and said frame-signal DSV data after polarity evaluation outputted from said frame-signal DSV/polarity evaluator so as to output a result of addition as said new cumulative DSV data; and an overflow/underflow processor which judges whether or not overflow or underflow has occurred in the new cumulative DSV data outputted from said adding means and performs exception handling with respect to said new cumulative DSV data when overflow or underflow has occurred therein.

2. An EFM encoder according to claim 1, wherein said adding means has:

a first bit converter which matches the number of bits of the received merging-bit DSV data with the number of bits of said cumulative DSV data and outputs the merging-bit DSV data having the matched number of bits;

a second bit converter which matches the number of bits of the received frame-signal DSV data after polarity evaluation with the number of bits of said cumulative DSV data and outputs the frame-signal DSV data after polarity evaluation having the matched number of bits;

a first adder which adds up the data outputted from said first bit converter and the data outputted from said second bit converter and outputs addition result data; and a second adder which adds up the addition result data outputted from said first adder and said cumulative DSV data and outputs a result of addition as said new cumulative DSV data.

3. An EFM encoder according to claim 2, wherein said frame-signal DSV/polarity evaluator has a first selector, an inverter, and a second selector, said first selector receiving said frame-signal DSV data, said frame-signal polarity signal, and said cumulative polarity signal and outputting said frame-signal DSV data and said frame-signal polarity signal to said second selector when said cumulative polarity signal indicates a High polarity or outputting said frame-signal DSV data and said frame-signal polarity signal to said inverter when said cumulative polarity signal indicates a Low polarity, said inverter outputting to said second selector, upon receiving said frame-signal DSV data and said frame-signal polarity signal, DSV data which has the same absolute value as said frame-signal DSV data and a sign opposite to the sign of said frame-signal DSV data and a polarity signal which indicates no polarity inversion when said frame-signal polarity signal indicates polarity inversion or indicates polarity inversion when said frame-signal polarity signal indicates no polarity inversion, said second selector receiving said cumulative polarity signal and outputting, when said cumulative polarity signal indicates the High polarity, the frame-signal DSV data received from said first selector as said frame-signal DSV data after polarity evaluation, while outputting the frame-signal polarity signal received from said first selector as said new cumulative polarity signal, or outputting, when said cumulative polarity signal indicates the Low polarity, the DSV data received from said inverter as said frame-signal DSV data after polarity evaluation, while outputting the polarity signal received from said inverter as said new cumulative polarity signal.

4. An EFM encoder according to claim 2, wherein said first bit converter has a function of converting the 2-bit merging-bit DSV data to 8-bit data such that a first bit of the 8-bit data is constantly "1", that second and third bits thereof are the two bits of said merging-bit DSV data, and that fourth to eighth bits thereof have the same value as the upper bit of said merging-bit DSV data.

5. An EFM encoder according to claim 2, wherein said second bit converter has a function of converting the 4-bit frame-signal DSV data after polarity evaluation to 8-bit data such that a first bit of the 8-bit data is constantly "0", that second to fifth bits thereof are the four bits of said frame-signal DSV data after polarity evaluation, and sixth to eighth bits thereof have the same value as the most significant bit of said frame-signal DSV data after polarity evaluation.

6. An EFM encoder according to claim 2, wherein said overflow/underflow processor judges whether or not overflow or underflow has occurred in said new cumulative DSV data based on a value of a most significant bit of said new cumulative DSV data, on a value of a most significant bit of said cumulative DSV data, and on a value of a most significant bit of the addition result data outputted from said first adder.

7. A DSV calculator for calculating, upon receiving each frame signal, DSV as an index for selecting merging-bit data which connects modulated frame signals to each other, said DSV calculator comprising:

adding means for adding up cumulative DSV data representing a value of DSV up to the frame signal immediately preceding said frame signal, frame-signal DSV data representing a value of DSV of said frame signal, and merging-bit DSV data representing a value of DSV of the merging-bit data which connects said frame signal to the immediately preceding frame signal so as to output a result of addition; and an overflow/underflow processor for judging whether or not overflow or underflow has occurred in the addition result outputted from said adding means, performing exception handling with respect to said addition result when overflow or underflow has occurred therein, and outputting said addition result that has undergone the exception handling as new cumulative DSV data, wherein said overflow/underflow processor has a function of holding, when overflow has occurred in the addition result outputted from said adding means, a difference between said addition result and a maximum value of said cumulative DSV data and adding, when overflow has not occurred in said addition result outputted from said adding means, the held difference to said addition result, while holding, when underflow has occurred in the addition result outputted from said adding means, a difference between said addition result and a minimum value of said cumulative DSV data and adding, when underflow has not occurred in the addition result outputted from said adding means, the held difference to said addition result.

8. A DSV calculator according to claim 7, wherein said adding means has:

a first adder for adding merging-bit DSV data and frame-signal DSV data and outputting a result of addition; and a second adder for adding up the addition result from said first adder and the cumulative DSV data and outputting a result of addition.

9. A DSV calculator according to claim 8, wherein said overflow/underflow processor has:

a first judging element for judging whether or not overflow or underflow has occurred in the addition result from said second adder and outputting the maximum value of the cumulative DSV data when overflow has occurred therein, outputting the minimum value of said cumulative DSV data when underflow has occurred therein, or outputting said addition result when neither overflow nor underflow has occurred therein;

a first differential calculator for calculating, when said first judging element judges that overflow has occurred in the addition result from said second adder, a difference between said addition result and the maximum value of said cumulative DSV data or calculating, when said first judging element judges that underflow has occurred in the addition result from said second adder, a difference between said addition result and the minimum value of said cumulative DSV data and outputting a result of calculation as first differential data;

a differential data holder;

a differential adder for adding up the data outputted from said first judging element and the data held in said differential data holder and outputting a result of addition;

a second judging element for judging whether or not overflow or underflow has occurred in the addition result from said differential adder and outputting the maximum value of said cumulative DSV data as the new cumulative DSV data when overflow has occurred therein, outputting the minimum value of said cumulative DSV data as said new cumulative DSV data when underflow has occurred therein, or outputting said addition result as said new cumulative DSV data when neither overflow nor underflow has occurred therein;

a second differential calculator for calculating, when said second judging element judges that overflow has occurred in the addition result from said differential adder, a difference between said addition result and the maximum value of said cumulative DSV data or calculating, when said second judging element judges that underflow has occurred in the addition result from said differential adder, a difference between said addition result and the minimum value of said cumulative DSV data and outputting a result of calculation as second differential data; and a held data adder for adding up said first differential data and said second differential data and causing said differential data holder to hold a result of addition.

10. A DSV calculator according to claim 9, wherein said first judging element has:

a maximum/minimum value recognizer for judging whether or not overflow or underflow has occurred in the addition result from said second adder based on a most significant bit of said cumulative DSV data, on a most significant bit of the addition result from said first adder, and on a most significant bit of the addition result from said second adder and outputting an overflow signal when overflow has occurred therein or outputting an underflow signal when underflow has occurred therein; and a data selector for outputting to said first differential calculator, upon receiving the overflow signal from said maximum/minimum value recognizer, the maximum value of said cumulative DSV data as the maximum/minimum value data and a judge signal indicating that overflow has occurred in the addition result from said second adder, while outputting the maximum value of said cumulative DSV data to said differential adder, or outputting to said first differential calculator, upon receiving the underflow signal from said maximum/minimum value recognizer, the minimum value of said cumulative DSV data as the maximum/minimum value data and a judge signal indicating that underflow has occurred in the addition result from said second adder, while outputting the minimum value of said cumulative DSV data to said differential adder.

11. A DSV calculator according to claim 10, wherein the first differential calculator has:

a subtracter for subtracting, from the cumulative DSV data, the maximum/minimum value data outputted from the data selector of the first judging element and outputting a result of subtraction;

an adder for adding up the subtraction result from said subtracter and the addition result from the first adder and outputting a result of addition; and a data selector for outputting, upon receiving the judge signal outputted from said data selector and indicating that overflow or underflow has occurred in the addition result from said second adder, the addition result from said adder as the first differential data.

12. A DSV calculator according to claim 9, wherein said second judging element has:

a maximum/minimum value recognizer for judging whether or not overflow or underflow has occurred in the addition result from said differential adder based on a most significant bit of the output data from said first judging element, on a most significant bit of the data held in said differential data holder, and on a most significant bit of the addition result from said differential adder and outputting an overflow signal when overflow has occurred therein or outputting an underflow signal when underflow has occurred therein; and a data selector for outputting to said second differential calculator, upon receiving the overflow signal from said maximum/minimum value recognizer, the maximum value of said cumulative DSV data as the maximum/minimum value data and a judge signal indicating that overflow has occurred in the addition result from said differential adder, while outputting the maximum value of said cumulative DSV data as the new cumulative DSV, or outputting to said second differential calculator, upon receiving the underflow signal from said maximum/minimum value recognizer, the minimum value of said cumulative DSV data as the maximum/minimum value data and a judge signal indicating that underflow has occurred in the addition result from said differential adder, while outputting the minimum value of said cumulative DSV data as the new cumulative DSV data.

13. A DSV calculator according to claim 12, wherein the second differential calculator has:

a subtracter for subtracting, from the output data from the first judging element, the maximum/minimum value data outputted from the data selector of the second judging element;

an adder for adding up the subtraction result from said subtracter and the data held in the differential data holder and outputting a result of addition; and a data selector for outputting, upon receiving the judge signal outputted from said data selector and indicating that overflow or underflow has occurred in the addition result from the differential adder, the addition result from said adder as the second differential data.

* * * * *